(12) United States Patent
Chen

(10) Patent No.: US 6,951,111 B2
(45) Date of Patent: Oct. 4, 2005

(54) COMBUSTING HYDROCARBONS EXCLUDING NITROGEN USING MIXED CONDUCTOR AND METAL HYDRIDE COMPRESSOR

(75) Inventor: Jeffrey W. Chen, Irvine, CA (US)

(73) Assignee: ChenTek, LLC, Irvine, CA (US)

( * ) Notice: Subject to any disclaimer, the term of this patent is extended or adjusted under 35 U.S.C. 154(b) by 0 days.

(21) Appl. No.: 10/679,583

(22) Filed: Oct. 6, 2003

(65) Prior Publication Data

US 2005/0072161 A1 Apr. 7, 2005

(51) Int. Cl.[7] .............................. F23R 3/40; F02C 3/30; F02C 3/22
(52) U.S. Cl. ............................. 60/775; 60/777; 60/723; 60/39.5; 60/39.55; 95/54
(58) Field of Search ...................... 60/777, 784, 39.511, 60/723, 775, 39.55, 39.5; 95/54

(56) References Cited

U.S. PATENT DOCUMENTS

| | | | |
|---|---|---|---|
| 4,505,120 A | | 3/1985 | Golben |
| 5,250,368 A | | 10/1993 | Golben et al. |
| 5,705,916 A | * | 1/1998 | Rudbeck et al. .............. 60/780 |
| 5,865,878 A | * | 2/1999 | Drnevich et al. .............. 95/54 |
| 6,114,400 A | * | 9/2000 | Nataraj et al. ................. 95/54 |
| 6,390,183 B2 | | 5/2002 | Aoyagi et al. |
| 6,537,514 B1 | * | 3/2003 | Prasad et al. ............. 423/437.1 |
| 6,602,920 B2 | * | 8/2003 | Hall et al. ................... 518/700 |
| 6,830,596 B1 | * | 12/2004 | Deckman et al. ............. 60/780 |

* cited by examiner

*Primary Examiner*—Ted Kim
(74) *Attorney, Agent, or Firm*—Stetina, Brunda Garred & Brucker

(57) ABSTRACT

Provided is a combustion engine having a combustion chamber. The combustion engine comprises an engine housing having an air intake port, a mixed conductor, a water intake port, an exhaust turbine and a hydrogen compressor assembly. The air intake port provides air to the mixed conductor which provides an oxygen-pure fraction of air to the combustion chamber by conducting oxygen ions in the air from a retentate side to a permeate side when the oxygen partial pressure on the permeate side is less than that on the retentate side. The water intake port provides water to the combustion chamber for combustion with hydrocarbon fuel and the oxygen-pure fraction of the air to produce exhaust fluid. The exhaust fluid expands in the exhaust turbine causing the turbine rotor to rotate producing mechanical energy. The hydrogen compressor assembly extracts hydrogen from the exhaust fluid and provides hydrogen to the exhaust turbine.

18 Claims, 14 Drawing Sheets

COMBUSTING HYDROCARBONS EXCLUDING NITROGEN USING MIXED CONDUCTOR AND METAL HYDRIDE COMPRESSOR

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to combustion of hydrocarbon fuel and, more particularly, to a combustion engine that extracts hydrogen from exhaust fluid for recirculation through an exhaust turbine. The combustion engine is further configured to combust an oxygen-enriched fraction of air with the hydrocarbon fuel in a manner such that the production of nitrous oxide ($NO_x$) and carbon dioxide ($CO_2$) emissions in the exhaust is reduced or eliminated.

In the operation of a typical combustion engine, heat energy is converted to mechanical energy in order to provide power for transportation, to produce electricity or to operate machinery. Combustion engines may operate in a cycle of repeated sequences of compressing a working fluid to a high pressure, heating the working fluid to a high temperature, then expanding the working fluid to produce mechanical work. Several different thermodynamic energy systems are commonly utilized for producing mechanical energy from heat energy.

Large-scale electric power plants use the Rankine system wherein the working fluid is a liquid such as water. The water evaporates when heated and then expands to produce mechanical work such as to turn a turbine which, when connected to a generator, produces electricity. The exhaust vapor from the turbine condenses and the water is pumped back to a boiler to repeat the cycle. Unfortunately, the large amount of heat that is lost during the condensation of the steam limits most Rankine system power plants to an efficiency of less than about 35%.

The Brayton system uses a gas, typically air, as the working fluid and may be configured as either open-cycle or closed-cycle. The gas turbine is a typical example of an open-cycle Brayton system. Air that is drawn into a compressor is heated and expanded through a turbine and exhausted into the atmosphere. The gas releases some of its heat to a heat exchanger after leaving the turbine. One disadvantage of the closed-cycle Brayton system is that a large heat exchanger is needed in order to transfer heat from an external combustion source to the working gas. However, a closed-cycle Brayton system has the advantage of using a compressed working gas which reduces equipment size and has a much lower air-to-fuel ratio than conventional open-cycle Brayton systems. Unfortunately, the consumption by the compressor of a large portion of mechanical work produced by the turbine limits the efficiency of the Brayton system to only about 40%.

Furthermore, the components required for compressing the air occupy about one-half of the total volume of the Brayton engine and account for approximately one-half of its total cost. The Otto and Diesel systems are most commonly represented by internal combustion engines commonly utilized by automobiles, trucks and ships wherein the working fluid is also a gas such as air. The internal combustion engines of the Otto and Diesel systems include complex reciprocating piston equipment for intermittently combusting hydrocarbon fuel with the air. However, such systems produce excessive noise and vibration with the additional drawback of large frictional losses occurring between the pistons and seals, thus limiting the efficiency the Otto and Diesel systems to about 40%

During the heating phase of each of the above-described thermodynamic systems, hydrocarbon fuel is combusted with air in order to raise the temperature of the working fluid. Unfortunately, exhaust fluids that are a byproduct of the combustion reaction may contain emissions that are harmful to the environment and to human health. Such emissions may take on a number of forms and may include oxides of nitrogen ($NO_x$), carbon monoxide, (CO), carbon dioxide ($CO_2$) and unreacted fuel in the form of particulate matter. Particulate matter is comprised mainly of unburned hydrocarbons.

The higher the inefficiency of the combustion engine, the greater the amount of unreacted fuel that is emitted from the combustion reaction and the greater the amount of fuel that is consumed per unit of power that is produced by the engine. In addition, the increase in fuel consumption also increases the cost of operating the engine. Furthermore, because the hydrocarbon fuel typically utilized in most combustion engines is comprised of non-renewable fossil fuels, poor fuel consumption has an adverse impact on the environment in that less accessible fuel sources must be extracted from ecologically sensitive locations around the world.

The United States Environmental Protection Agency (EPA) is responsible for regulating emissions that can be harmful to human health. The EPA designates the set of harmful emissions as criteria pollutants. Included in the set of criteria pollutants are CO, $NO_2$ and other byproducts that are exhausted from the above-mentioned thermodynamic systems. Exposure to high levels of CO is associated with visual impairment in humans. $NO_2$ can irritate the lungs and lower resistance to respiratory infections. $NO_2$ is also an ingredient of acid rain which can damage trees and lakes. Although naturally occurring to some degree in the atmosphere, increased concentrations of $NO_2$ and $CO_2$ as byproducts of fossil fuel combustion can lead to an increase in the global average temperature, also known as global warming. These so called greenhouse gases absorb heat in the atmosphere.

Reports indicate that the continuing increase of $NO_2$ and $CO_2$ concentrations in the atmosphere will lead to a dangerous interference with the planet's climate system, resulting in more frequent and stronger storms, floods and droughts that may threaten food production while simultaneously increasing insect-borne disease as a hazard to human health. The severity of the problem is such that in recent years, a number of international treaties specifically aimed at reducing the emission of greenhouse gases have been ratified by developing countries. Furthermore, individual nations have developed a wide variety of programs specifically targeted at reducing the level of environmentally harmful emissions.

The prior art approaches to addressing the above-mentioned emissions problems are numerous. One such approach to reducing emissions is by the after-treatment of exhaust in order to reduce the amount of unreacted hydrocarbons. In this approach, air is introduced into the high temperature exhaust stream in order to continue oxidizing unburned hydrocarbons. While this method is effective in eliminating harmful emissions, the overall efficiency of the engine is not improved. Furthermore, after-treatment of exhaust requires additional emissions control components that add weight and complexity to the combustion engine as they must be configured to withstand the increased temperatures occurring within the exhaust stream.

Another drawback to this approach is the injection of air into the exhaust stream results in an increase in $NO_x$ production. This occurs because in a high temperature exhaust, nitrogen will mix with excess oxygen that is not burned in the combustion chamber. Another prior art approach to reducing emissions is to inject atomic nitrogen into the exhaust stream which causes oxides of nitrogen ($NO_x$) to be reduced to nitrogen and oxygen. A common source of atomic nitrogen is ammonia ($NH_3$). However, storing and/or transporting $NH_3$ near a power plant or in an automobile is not practical from both a complexity and operational standpoint nor is it cost effective.

As can be seen, there exists a need to provide a combustion engine that reduces or eliminates that production of environmentally harmful and hazardous greenhouse gases such as $NO_x$, $CO_2$ and VOC's. There also exists a need for a simple combustion engine requiring no emissions control equipment such that the overall cost and complexity of the combustion engine may be reduced. In addition, there exists a need for a combustion engine that may operate without a large heat exchanger that is typically required of closed-cycle Brayton systems. Furthermore, there exists a need for a combustion engine with a high operating efficiency and low fuel consumption. Additionally, there exists a need for a combustion engine having the capability of capturing $CO_2$ as an aid in global warming abatement.

BRIEF SUMMARY OF THE INVENTION

According to one aspect of the present invention, there is provided a combustion engine that extracts hydrogen from exhaust fluid for recirculation through an exhaust turbine. Exhaust fluid expands in the exhaust turbine to cause a turbine rotor to rotate. The exhaust fluid results from the combustion of hydrocarbon fuel. The combustion engine is configured to combust hydrocarbons excluding nitrogen in order to eliminate $NO_x$ emissions. The combustion engine uses a mixed conductor and operates with hydrogen as a working gas wherein the mixed conductor limits the rate at which oxygen can react with the hydrocarbon fuel.

The combustion engine is also configured to prevent the formation of hydrocarbon and CO emissions by reacting products with steam. Water gas shift reaction catalysts are further utilized in the combustion engine in order to prevent the formation of volatile organic compounds (VOC's)—organic chemicals that have a high vapor pressure and which easily form vapors. The water gas shift reaction catalysts convert VOC emissions to hydrogen.

The combustion engine is comprised of an engine housing having an air intake port, a mixed conductor, a water intake port, an exhaust turbine and a hydrogen compressor assembly. The engine housing includes a combustion chamber that utilizes a mixed conductor to provide a substantially oxygen-pure fraction of air to the combustion chamber for combustion with hydrocarbon fuel and water and which results in the production of exhaust fluid. The hydrocarbon fuel may be octane although it is contemplated that the combustion engine may be configured to operate on many other types of hydrocarbon fuels.

The exhaust fluid may contain carbon monoxide, carbon dioxide, water, steam and hydrogen as well as VOC's. In the combustion engine, the air intake port is fluidly connected to the engine housing and provides air to the engine housing. The combustion engine may include an intake compressor which may draw air from surrounding atmosphere, pressurize the air and provide the air to the air intake port. The mixed conductor is disposed adjacent the combustion chamber and has a retentate side and a permeate side. The retentate side is fluidly connected to the air intake port. The permeate side is positioned such that it is exposed to the combustion chamber. The mixed conductor conducts oxygen ions from the retentate side to the permeate side when a partial pressure of oxygen in the air on the permeate side is less than a partial pressure of oxygen on the retentate side in order to provide the oxygen-pure fraction of the air to the combustion chamber. The mixed conductor may be configured as a mixed conductor stack wherein multiple mixed conductors are stacked upon one another and which cooperate to provide the oxygen-pure fraction of air to the combustion chamber. It is contemplated that the mixed conductor may be fabricated of a variety of alternative materials.

A heating system may be included with the combustion engine to heat the mixed conductor. In addition, the heating system may include an electrical heating element to ignite an residual oxygen-enriched fraction of air that may be formed in the exhaust fluid as a result of incomplete combustion of the oxygen-pure fraction of air with the hydrocarbon fuel and the pressurized water. An iron oxide catalyst may be disposed within the combustion chamber to promote a high temperature water-gas shift (WGS) reaction in the combustion chamber such that a portion of the carbon monoxide in the exhaust fluid reacts with water in the exhaust fluid wherein the portion of the carbon monoxide may be converted into carbon dioxide. The water intake port is fluidly connected to the combustion chamber to provide pressurized water to the combustion chamber for combustion with the hydrocarbon fuel and the oxygen-pure fraction of the air. The exhaust turbine has an exhaust turbine inlet, an exhaust turbine outlet and a turbine rotor. The exhaust turbine inlet is fluidly connected to the combustion chamber and it receives the exhaust fluid from the combustion chamber. The turbine rotor is configured to rotate upon expansion of the exhaust fluid that is received from the exhaust turbine inlet to convert thermal energy of the expanding exhaust fluid into mechanical energy for performing useful work such as generating electricity.

The hydrogen compressor assembly is fluidly connected to the exhaust turbine outlet to receive the exhaust fluid from the exhaust turbine outlet. The hydrogen compressor assembly is also fluidly connected to the exhaust turbine inlet to provide hydrogen to the exhaust turbine. The hydrogen compressor assembly includes metal hydride material that extracts hydrogen from the exhaust fluid. The hydrogen compressor assembly also pressurizes the extracted hydrogen. The extracted pressurized hydrogen may then be recycled back to the exhaust turbine where it may be expanded through the exhaust turbine for rotating the turbine rotor. The hydrogen compressor assembly may be comprised of a first metal hydride hydrogen compressor, a gas absorber and a second metal hydride hydrogen compressor cooperating together to process the exhaust fluid. The first metal hydride hydrogen compressor is fluidly connected to the exhaust turbine outlet to receive the exhaust fluid. The first metal hydride hydrogen compressor condenses steam in the exhaust fluid generating heat and uses the heat of condensation of the steam to adsorb and pressurize a portion of the hydrogen contained in the exhaust fluid.

The gas absorber is fluidly connected to the first metal hydride hydrogen compressor and receives the exhaust fluid and the hydrogen from the first metal hydride hydrogen compressor. The gas absorber allows the water in the exhaust fluid to absorb the carbon dioxide in the exhaust fluid. The second metal hydride hydrogen compressor is fluidly connected to the gas absorber and receives the exhaust fluid and the hydrogen from the gas absorber. The second metal hydride hydrogen compressor also adsorbs and pressurizes a portion of the hydrogen and vents a portion of the carbon dioxide to atmosphere. A gas absorber valve regulates the flow of water out of the gas absorber toward the second metal hydride hydrogen compressor. A first compressor valve regulates the flow of the condensed steam or water out of the first metal hydride hydrogen compressor. A first pump receives the condensed steam or water from the first compressor valve. The first pump may pressurize the condensed steam or water prior to delivery to the water intake port.

Metal hydride material in the first and second metal hydride hydrogen compressors allows the hydrogen in the exhaust fluid to be extracted from the exhaust fluid and absorbed into the metal hydride material at a low temperature. The metal hydride material in the first and second metal hydride hydrogen compressors promotes the release of the absorbed hydrogen at elevated temperature and pressure when the metal hydride material is heated. A desiccant may be fluidly connected between the gas absorber and the second metal hydride hydrogen compressor to remove moisture from the hydrogen prior to the second metal hydride hydrogen compressor receiving the hydrogen. A gas desorber may receive the exhaust fluid and extract carbon dioxide from the water and vent a remaining portion of the carbon dioxide to atmosphere.

The second heat exchanger may receive the water from the gas desorber to air cool the water. The gas absorber may receive the cooled water such that the gas absorber may be cooled. A second compressor valve may regulate the flow of water from the second metal hydride hydrogen compressor to the gas desorber. A throttling valve may be fluidly connected to the second compressor valve for receiving water and for throttling the water flowing from the second metal hydride hydrogen compressor to the gas desorber. A gas desorber valve may regulate the flow of water from the gas desorber. A second pump may receive the condensed steam or water from the gas desorber. The second pump may also pressurize the water received from the gas desorber prior to delivery of the water to the second heat exchanger.

The hydrogen compressor assembly may further include a first accumulator, a first control valve and a nickel metal hydride battery. The first accumulator may be fluidly connected to the gas absorber for collecting and storing the hydrogen that is received from the gas absorber. The first control valve may be operative to regulate the flow of hydrogen from the first accumulator to the nickel metal hydride battery. The hydrogen compressor assembly may further include a second accumulator and a second control valve. The second accumulator may store hydrogen. The second control valve may regulate the flow of the portion of the hydrogen from the second accumulator to the combustion chamber.

An intake compressor may be fluidly connected to the air intake port to draw air from ambient atmosphere and pressurize the air prior to delivery to the engine housing. A first recuperator may be fluidly connected to the intake compressor for heating the pressurized air prior to delivery of the air to the engine housing. A second recuperator may cross-circulate exhaust fluid from the exhaust turbine outlet, condensed steam from the first water pump, and the portion of the hydrogen from the first metal hydride hydrogen compressor such that the portion of the hydrogen that is received from the first metal hydride hydrogen compressor may be heated prior to delivery to the exhaust turbine. Simultaneously, the hydrogen from the exhaust turbine may be cooled prior to delivery to the first metal hydride hydrogen compressor. The second recuperator may be coated with cuprous oxide to promote a low temperature WGS reaction wherein any remaining carbon monoxide in the exhaust fluid may be converted into carbon dioxide. A first heat exchanger may be included to heat hydrogen prior to delivery to the exhaust turbine. The first heat exchanger may be heated by heated air leaving the exterior of the combustion chamber such that hydrogen may be heated prior to the being received by the exhaust turbine.

According to another aspect of the present invention, there is provided a method for rotating the turbine rotor of the exhaust turbine utilizing recirculated hydrogen extracted from the exhaust fluid. The method includes the step of providing the mixed conductor to the combustion engine. Air is provided to the retentate side of the mixed conductor. The air flows at atmospheric pressure along the retentate side of the mixed conductor to heat the mixed conductor. Due to the differential in partial pressures of oxygen on the retentate side as compared to the permeate side, oxygen ions in the air are conducted through the mixed conductor to produce the oxygen-pure fraction of air on the permeate side. Pressurized water is provided to the combustion chamber to maintain the temperature of the combustion chamber. The combustion of hydrocarbon fuel in the combustion chamber continuously depletes the oxygen on the permeate side of the mixed conductor to provide a driving force for oxygen to be conducted through the mixed conductor from the retentate side to the permeate side. Iron oxide catalyst may be disposed within the combustion chamber to promote a high temperature water-gas shift (WGS) reaction wherein a portion of the carbon monoxide in the exhaust fluid reacts with water in the exhaust fluid and is converted into carbon dioxide. The exhaust fluid may be expanded within the exhaust turbine to cause the turbine rotor to rotate for producing mechanical energy.

Hydrogen may be extracted from the expanded exhaust fluid when the exhaust fluid is routed through the hydrogen compressor assembly which may be comprised of the first metal hydride hydrogen compressor, the gas absorber and the second metal hydride hydrogen compressor cooperating together to process the exhaust fluid. Each one of the first and second metal hydride hydrogen compressors contains metal hydride material that is alternately heated and cooled to extract hydrogen in the exhaust fluid. The extraction of the hydrogen may include absorbing the carbon dioxide into the water contained in the exhaust fluid. The extraction of the hydrogen may include venting a portion of the carbon dioxide to atmosphere or collecting and storing the portion of the carbon dioxide. The extracted hydrogen may be pressurized simultaneous with the extraction of the hydrogen. The pressurization of the extracted hydrogen may further include generating heat by condensing steam in the exhaust fluid and pressurizing the hydrogen to a pressure greater than the pressure on the permeate side of the combustion chamber by using heat of condensation of the steam.

The pressurized extracted hydrogen may be recirculated through the exhaust turbine to improve the operating efficiency of the combustion engine as mentioned above. The pressurized extracted hydrogen may be further heated by recirculating the hydrogen along the retentate side of the mixed conductor during combustion of the hydrocarbon fuel.

BRIEF DESCRIPTION OF THE DRAWINGS

These as well as other features of the present invention, will become more apparent upon reference to the drawings wherein.

DETAILED DESCRIPTION OF THE INVENTION

Figure 1:
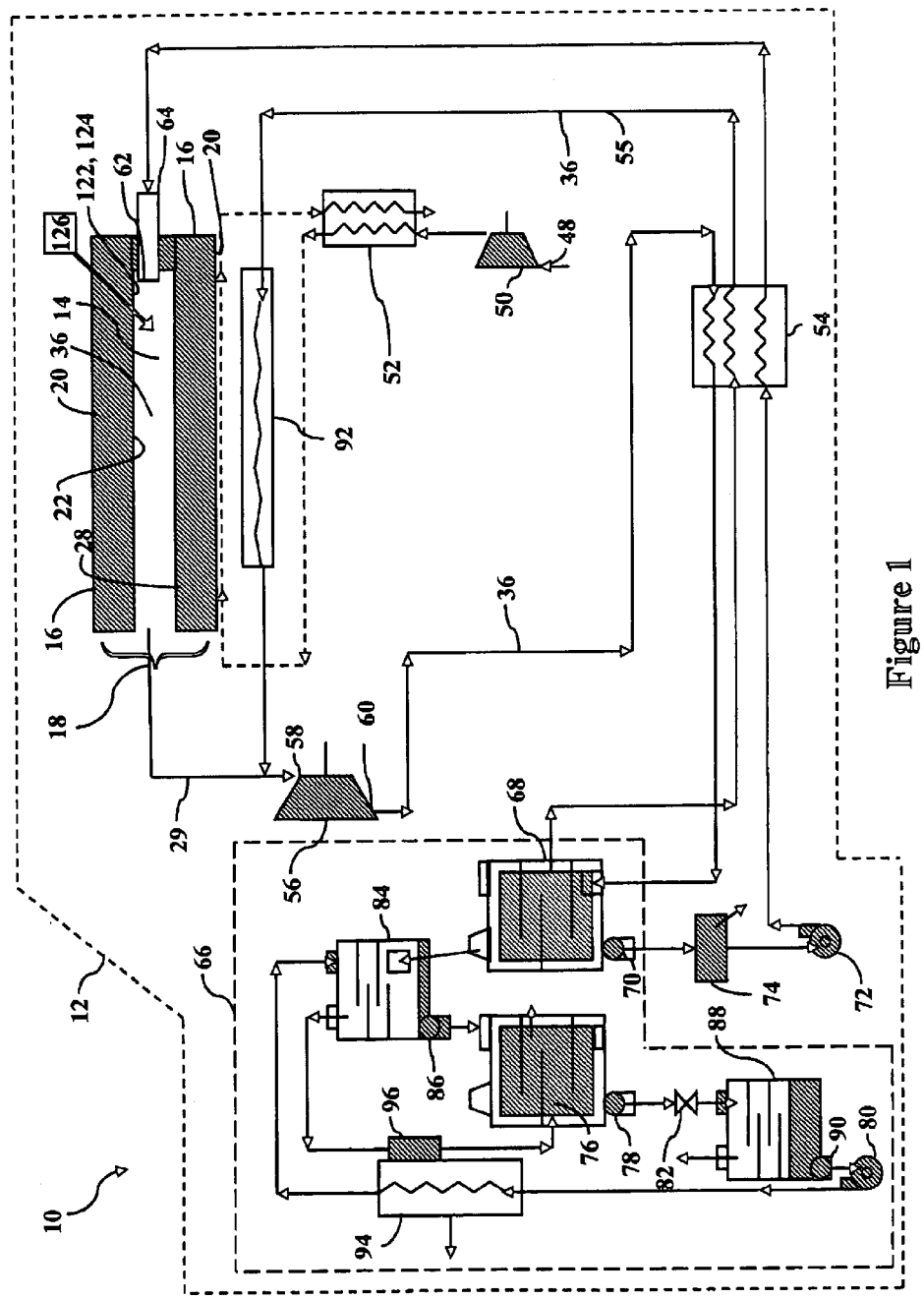
FIG. 1 is a schematic diagram of the combustion engine of the present invention illustrating the flow path of exhaust fluid circulating through an exhaust turbine and through a hydrogen compressor assembly of the combustion engine.

Referring now to the drawings wherein the showings are for purposes of illustrating preferred embodiments of the present invention only, and not for purposes of limiting the same, FIG. 1 is a schematic diagram of a combustion engine 10 of the present invention illustrating the interconnectivity of components that make up the combustion engine 10. FIG. 1 shows the combustion engine 10 as being comprised of an engine housing 12, an air intake port 48, a mixed conductor 16, a water intake port 62, an exhaust turbine 56 and a hydrogen compressor assembly 66. The engine housing 12 includes a combustion chamber 14 that utilizes a mixed conductor 16 to provide a substantially oxygen-pure fraction of air to the combustion chamber 14 for combustion with hydrocarbon fuel and water and which results in the production of exhaust fluid.

The combustion engine 10 of the present invention is configured to operate under a process that combusts the hydrocarbon fuel while excluding the production of nitrogen as a combustion byproduct which, as mentioned above, can result in the creation of environmentally harmful gases such as nitrous oxide ($NO_x$) and carbon dioxide ($CO_2$). The hydrocarbon fuel may be octane although it is contemplated that the combustion engine 10 may be configured to operate on many other types of hydrocarbon fuels. The combustion engine 10 of the present invention is also configured to recirculate hydrogen that is extracted from the exhaust fluid. The hydrogen is utilized as a working gas in the combustion engine 10 and is recirculated through the exhaust turbine 56 to provide useful work, as will also be described in greater detail below.

Shown in FIG. 1 is a flow path of the exhaust fluid as it flows through the combustion engine 10. As will be described in greater detail below, the exhaust fluid may contain carbon monoxide, carbon dioxide, water, steam and hydrogen as well as volatile organic compounds (VOC's). In the combustion engine 10, the air intake port 48 is fluidly connected to the engine housing 12 and is configured to provide air to the engine housing 12. The combustion engine 10 may further include an intake compressor 50 fluidly connected to the air intake port 48. The intake compressor 50 may draw air from surrounding atmosphere, pressurize the air and provide the air to the air intake port 48.

The mixed conductor 16 is disposed adjacent the combustion chamber 14. The mixed conductor 16 has a retentate side 20 and a permeate side 22. The retentate side 20 is fluidly connected to the air intake port 48 such that it may receive air from the air intake port 48. The permeate side 22 is positioned such that it is exposed to the combustion chamber 14. The mixed conductor 16 is configured to conduct oxygen ions from the retentate side 20 to the permeate side 22 when a partial pressure of oxygen in the air on the permeate side 22 is less than a partial pressure of oxygen on the retentate side 20. In this manner, the mixed conductor 16 provides the oxygen-pure fraction of the air to the combustion chamber 14.

Figure 3:
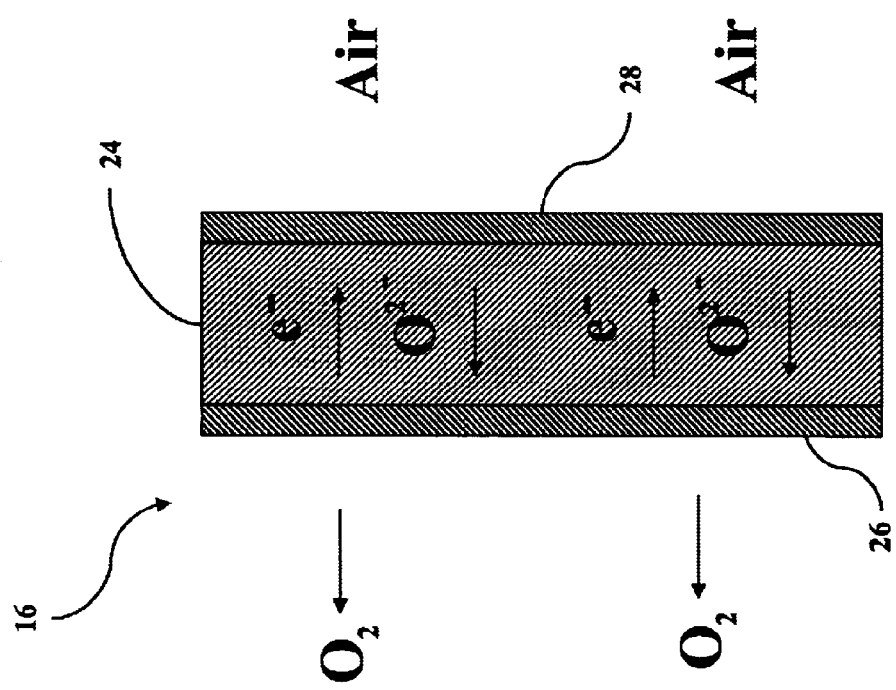
FIG. 3 is a schematic diagram of a mixed conductor as may be utilized in the combustion engine illustrating the manner in which oxygen ions in air are conducted from a retentate side to a permeate side of the mixed conductor.

Referring briefly to FIG. 3, shown is a schematic diagram of the mixed conductor 16 as may be utilized in the combustion engine 10 of the present invention. As shown, the mixed conductor 16 includes a membrane 24 having the retentate side 20 and the permeate side 22. The membrane 24 may be coated with a reduction catalyst 28 on the retentate side 20 and an oxidation catalyst 26 on the permeate side 22. The term "mixed conductor" refers to the ability to conduct a mixture of oxygen ions and loose electrons through mobile defects in the mixed conductor 16. The mobile defects include oxygen vacancies, oxygen interstitials and electron holes formed in the mixed conductor 16. In this regard, the mixed conductor 16 acts as an oxygen separator that separates the oxygen ions from air.

When exposed to air and with its temperature raised, the mixed conductor 16 is configured to conduct oxygen thereagainst a total pressure differential across the retentate and permeate sides 20, 22 if a partial pressure of oxygen in the air on the permeate side 22 is less than a partial pressure of oxygen on the retentate side 20. In this manner, the substantially oxygen-pure fraction of air may be produced on the permeate side 22. It should be noted that the oxygen-pure fraction of air may not be completely oxygen-pure but that the oxygen-pure fraction of air may contain constituents other than oxygen in varying amounts.

The oxygen-pure fraction of air may comprise substantially nitrogen-free oxygen such that the production of $NO_x$ as a combustion byproduct may be reduced or eliminated. The schematic diagram of FIG. 3 illustrates the manner in which oxygen ions in air may be conducted from the permeate side 22 to the retentate side 20. The mixed conductor 16 may be configured as a mixed conductor stack 18 wherein multiple mixed conductors 16 are stacked upon one another. The mixed conductor 16s 16 in the mixed conductor stack 18 may cooperate to provide the oxygen-pure fraction of air to the combustion chamber 14. It is contemplated that the mixed conductor 16 may be fabricated of a variety of alternative materials.

A heating system 122, shown in FIGS. 1, 4, 6, 9 and 11, may optionally be included with the combustion engine 10 and may be placed in thermal contact with the mixed conductor 16, The heating system 122 may be configured to heat the mixed conductor 16 in order to increase the conducting efficiency of the mixed conductor 16. In addition, the heating system 122 may include an electrical heating element 124, shown in FIGS. 1, 4, 6, 9 and 11, disposed within the combustion chamber 14. The electrical heating element 124 may be configured to ignite the residual oxygen-enriched fraction of air that may be formed in the exhaust fluid. The oxygen-enriched fraction of air may be formed as a result of incomplete combustion of the oxygen-pure fraction of air with the hydrocarbon fuel and the pressurized water.

An iron oxide catalyst (not shown) may also be disposed within the combustion chamber 14. The iron oxide catalyst promotes a high temperature water-gas shift (WGS) reaction in the combustion chamber 14 such that a portion of the carbon monoxide in the exhaust fluid reacts with water in the exhaust fluid. In the reaction, the portion of the carbon monoxide may be converted into carbon dioxide. In addition, the high temperature WGS reaction produces additional hydrogen 36. The high temperature WGS may be expressed according to the following reaction:

$$CO+H_2O \quad 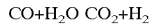 \quad CO_2+H_2$$

As can be seen in the schematic diagram of FIGS. 1, 4, 6, 9 and 11, the water intake port 62 is fluidly connected to the combustion chamber 14 and may be disposed adjacent to the combustion chamber 14. The water intake port 62 is configured to provide pressurized water to the combustion chamber 14 for subsequent combustion with the hydrocarbon fuel and the oxygen-pure fraction of the air. The water intake port 62 may be fluidly connected to a water source 64 such as a water source tank (not shown). Also shown in FIGS. 1, 4, 6, 9 and 11 is a hydrocarbon fuel source 126 being included with the combustion engine 10 in order to provide the hydrocarbon fuel to the combustion chamber 14. As was earlier mentioned, the combustion chamber 14 utilizes the mixed conductor 16 to provide a substantially oxygen-pure fraction of air to the combustion chamber 14 for combustion with the hydrocarbon fuel and water resulting in the production of the exhaust fluid.

Also shown in FIG. 1 is the exhaust turbine 56 which has an exhaust turbine inlet 58, an exhaust turbine outlet 60 and a turbine rotor (not shown). The turbine rotor may be rotatably coupled to the engine housing 12. The exhaust turbine inlet 58 is fluidly connected to the combustion chamber 14 such that it receives the exhaust fluid from the combustion chamber 14 and delivers the exhaust fluid to the turbine rotor. The exhaust turbine outlet 60 is configured to receive the expanded exhaust fluid from the turbine rotor. The turbine rotor is configured to rotate upon expansion of the exhaust fluid that is received from the exhaust turbine inlet 58. In this manner, the exhaust turbine 56 is configured to convert thermal energy of the expanding exhaust fluid into mechanical energy. The mechanical energy may be utilized for performing useful work such as generating electricity.

The combustion engine 10 of the present invention further includes a hydrogen compressor assembly 66. As can be seen in FIG. 1, the hydrogen compressor assembly 66 is fluidly connected to the exhaust turbine outlet 60 such that the hydrogen compressor assembly 66 may receive the exhaust fluid from the exhaust turbine outlet 60. The hydrogen compressor assembly 66 is also fluidly connected to the exhaust turbine inlet 58 such that hydrogen compressor assembly 66 may provide hydrogen 36 to the exhaust turbine 56. The hydrogen compressor assembly 66 includes metal hydride material that extracts hydrogen 36 from the exhaust fluid. The hydrogen compressor assembly 66 is also configured to pressurize the extracted exhaust fluid. The combustion engine 10 is configured such that the extracted pressurized hydrogen 36 may then be recycled back to the exhaust turbine 56 where it may be received by the exhaust turbine inlet 58 and expanded through the exhaust turbine 56 for rotating the turbine rotor. In this manner, the extracted pressurized hydrogen 36 is continuously recirculated through the exhaust turbine 56 to improve the overall operating efficiency of the combustion engine 10, as will be described in greater detail below.

As can also be seen in FIG. 1, the hydrogen compressor assembly 66 may be comprised of a first metal hydride hydrogen compressor 68, a gas absorber 84 and a second metal hydride hydrogen compressor 76 cooperating together to process the exhaust fluid. The first metal hydride hydrogen compressor 68 is fluidly connected to the exhaust turbine outlet 60 such that the first metal hydride hydrogen compressor 68 may receive the exhaust fluid from the exhaust turbine 56. The first metal hydride hydrogen compressor 68 is configured to condense the steam in the exhaust fluid. The first metal hydride hydrogen compressor 68 is also configured to use the heat of condensation of the steam in order to adsorb and pressurize a portion of the hydrogen 36 contained in the exhaust fluid.

The gas absorber 84 is fluidly connected to the first metal hydride hydrogen compressor 68 such that the gas absorber 84 may receive the exhaust fluid and the hydrogen 36 from the first metal hydride hydrogen compressor 68. The gas absorber 84 is configured to allow the water in the exhaust fluid to absorb the carbon dioxide in the exhaust fluid. The second metal hydride hydrogen compressor 76 is fluidly connected to the gas absorber 84 to receive the exhaust fluid and the hydrogen 36 from the gas absorber 84. The second metal hydride hydrogen compressor 76 is configured to adsorb and pressurize a portion of the hydrogen 36 and to vent a portion of the carbon dioxide to atmosphere. Alternatively, the second metal hydride hydrogen compressor 76 may be configured to collect and store the portion of the carbon dioxide such as in a storage tank (not shown).

A gas absorber valve 86 may be included with the hydrogen compressor assembly 66. As shown in FIG. 1, the gas absorber valve 86 may be fluidly connected between the gas absorber 84 and the second metal hydride hydrogen compressor 76. In FIG. 1, the gas absorber valve 86 is shown disposed on a lower end of the gas absorber 84. The gas absorber valve 86 may be operative to regulate the flow of water out of the gas absorber 84 toward the second metal hydride hydrogen compressor 76. A first compressor valve 70 may also be included with the hydrogen compressor assembly 66 and may be fluidly connected to the first metal hydride hydrogen compressor 68. In FIG. 1, the first compressor valve 70 is shown disposed on a lower end of the first metal hydride hydrogen compressor 68. The first compressor valve 70 may be operative to regulate the flow of the condensed steam or water out of the first metal hydride hydrogen compressor 68.

In addition, a first pump may be fluidly connected to the first compressor valve 70 for receiving the condensed steam or water from the first compressor valve 70. The first pump may be configured to pressurize the condensed steam or water prior to delivery to the water intake port 62. Optionally, a water tank 74 may be included with the combustion engine 10 to store the condensed steam or water flowing from the first compressor valve 70. The water tank 74 may be fluidly connected between the first compressor valve 70 and the first water pump 72.

As was earlier mentioned, the exhaust fluid may be at least partially comprised of hydrogen 36, steam, water, carbon monoxide and carbon dioxide. Metal hydride material is disposed in the first and second metal hydride hydrogen compressors 68, 76. The metal hydride material in the first and second metal hydride hydrogen compressors 68, 76 allows the hydrogen 36 in the exhaust fluid to be extracted from the exhaust fluid and absorbed into the metal hydride material at a low temperature. The metal hydride material in the first and second metal hydride hydrogen compressors 68, 76 promotes the release of the absorbed hydrogen 36 at elevated temperature and pressure when the metal hydride material is heated, as will be described in greater detail below.

Referring still to FIG. 1, a desiccant 96 may be further included with the combustion engine 10. The desiccant 96 may be fluidly connected between the gas absorber 84 and the second metal hydride hydrogen compressor 76. The desiccant 96 may remove moisture from the hydrogen 36 prior to the second metal hydride hydrogen compressor 76 receiving the hydrogen 36. The combustion engine 10 may further comprise a gas desorber 88 and a second heat exchanger 94. The gas desorber 88 may be fluidly connected to the second metal hydride hydrogen compressor 76 for receiving the exhaust fluid therefrom. The gas desorber 88 may be configured to extract carbon dioxide from the water and vent a remaining portion of the carbon dioxide to atmosphere.

Alternatively, the gas desorber 88 may be configured to collect and store the remaining portion of the carbon dioxide such as in a storage tank (not shown). The second heat exchanger 94 may be fluidly connected between the gas absorber 84 and the gas desorber 88 for receiving the water from the gas desorber 88. The second heat exchanger 94 may be configured to air cool the water by cross-circulating ambient air with flowing through the second heat exchanger 94. The gas absorber 84 is fluidly connected to the second heat exchanger 94 for receiving the cooled water such that the gas absorber 84 may be cooled thereby. In this manner, the efficiency with which the gas absorber 84 may allow the water in the exhaust fluid to absorb carbon dioxide may be improved.

A second compressor valve 78 may be may also be included with the hydrogen compressor assembly 66. The second compressor valve 78 may be fluidly connected to the second metal hydride hydrogen compressor 76. In FIG. 1, the second compressor valve 78 is shown disposed on a lower end of the second metal hydride hydrogen compressor 76. The second compressor valve 78 may be operative to regulate the flow of water from the second metal hydride hydrogen compressor 76 to the gas desorber 88. A throttling valve 82 may be further included with the hydrogen compressor assembly 66 and may be fluidly connected to the second compressor valve 78 for receiving water therefrom. The throttling valve 82 may be operative to throttle the water flowing from the second metal hydride hydrogen compressor 76 to the gas desorber 88.

A gas desorber valve 90 may be may also be included with the combustion engine 10 and may be fluidly connected to the gas desorber 88. In FIG. 1, the gas desorber valve 90 is shown disposed on a lower end of the gas desorber 88. The gas desorber valve 90 may be operative to regulate the flow of water from the gas desorber 88. A second pump 80 may be further be included with the combustion engine 10 and may be fluidly connected between the gas desorber 88 and the second heat exchanger 94 for receiving the condensed steam or water from the gas desorber 88. The second pump 80 may be configured to pressurize the water received from the gas desorber 88 prior to delivery of the water to the second heat exchanger 94.

Figure 11:
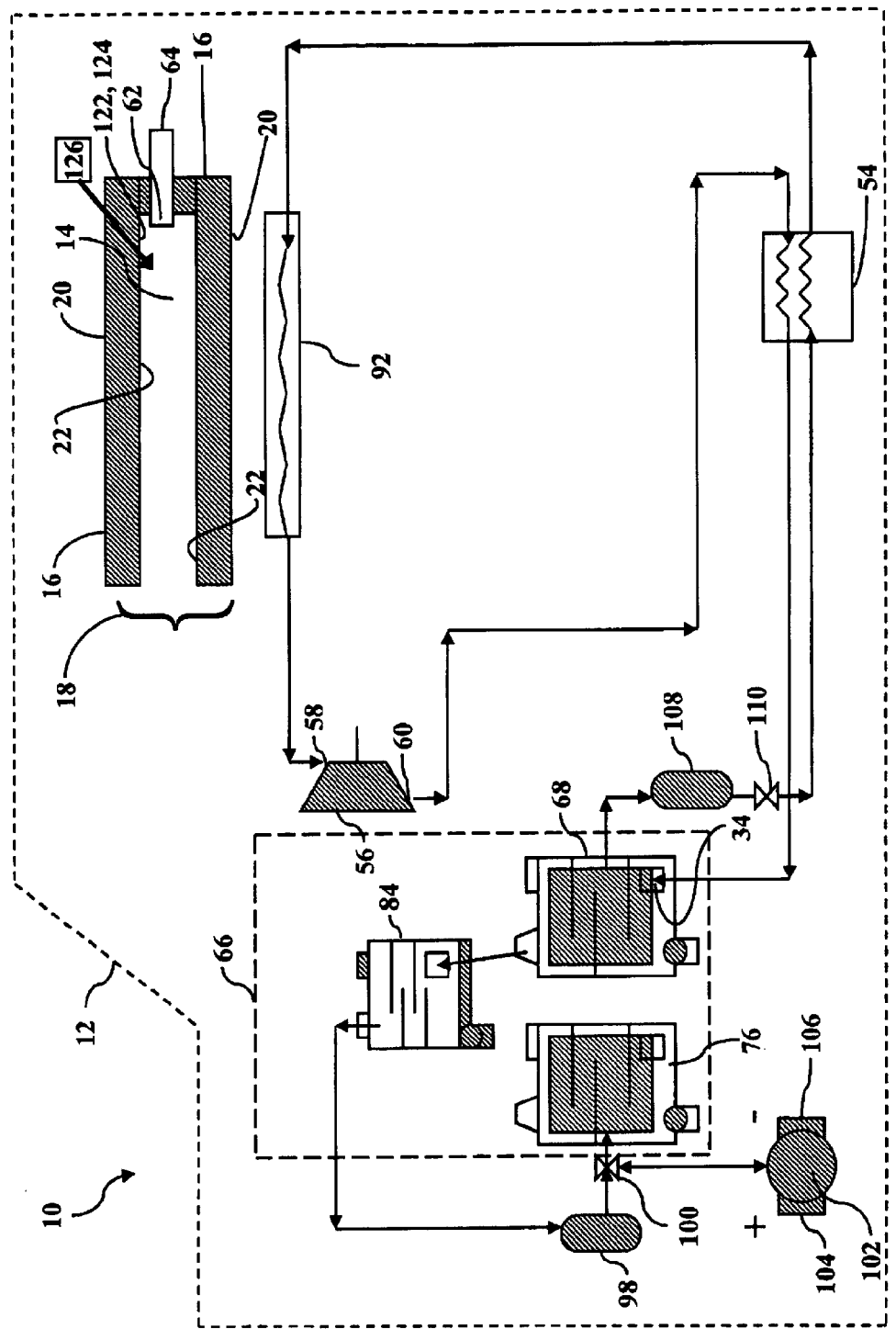
FIG. 11 is a schematic diagram of the combustion engine in an alternative embodiment having a segmented nickel metal hydride battery.

Referring briefly to FIG. 11, the hydrogen compressor assembly 66 may further include a first accumulator 98, a first control valve 100 and a nickel metal hydride battery 102. The nickel metal hydride battery 102 may be similar to that disclosed in U.S. Pat. No. 5,250,368, and which is herein incorporated by reference. The first accumulator 98 may be fluidly connected to the gas absorber 84 for receiving the hydrogen 36. The first accumulator 98 may be configured to collect and to store the hydrogen 36 that is received from the gas absorber 84. The first control valve 100 may be fluidly connected between the first accumulator 98 and the second metal hydride hydrogen compressor 76. The nickel metal hydride battery 102 may be fluidly connected to the first control valve 100. The first control valve 100 may be operative to regulate the flow of hydrogen 36 from the first accumulator 98 to the nickel metal hydride battery 102. The first control valve 100 may also be operative to regulate the flow of hydrogen 36 from the first accumulator 98 to the second metal hydride hydrogen compressor 76.

Referring still to FIG. 11, the hydrogen compressor assembly 66 may further include a second accumulator 108 and a second control valve 110. The second accumulator 108 may be fluidly connected to the first metal hydride hydrogen compressor 68 for receiving the portion of the hydrogen 36 from the first metal hydride hydrogen compressor 68. The second accumulator 108 may be configured to store the portion of the hydrogen 36. The second control valve 110 may be fluidly connected to the second accumulator 108 with the second control valve 110 being operative to regulate the flow of the portion of the hydrogen 36 from the second accumulator 108 to the combustion chamber 14.

Referring back now to FIG. 1, the combustion engine 10 may further include an intake compressor 50 fluidly connected to the air intake port 48. The intake compressor 50 may be configured to draw air from ambient atmosphere and pressurize the air prior to delivery to the engine housing 12. The combustion engine 10 may further comprise a first recuperator 52 fluidly connected to the intake compressor 50 for receiving the pressurized air. As was earlier mentioned, the efficiency of the mixed conductor 16 increases as its temperature increases. The first recuperator 52 may be configured to heat the pressurized air prior to delivery of the air to the engine housing 12 such that the temperature of the mixed conductor 16 may be elevated.

The second recuperator 54 may be configured to cross-circulate exhaust fluid from the exhaust turbine outlet 60, condensed steam from the first water pump 72, and the portion of the hydrogen 36 from the first metal hydride hydrogen compressor 68, as can be seen in FIG. 1. By cross-circulating such fluids, heat may be exchanged between the exhaust fluid, the condensed steam and the portion of the hydrogen 36. In this manner, the portion of the hydrogen 36 that is received from the first metal hydride hydrogen compressor 68 may be heated prior to delivery to the exhaust turbine 56. Simultaneously, the hydrogen 36 from the exhaust turbine 56 may be cooled prior to delivery to the first metal hydride hydrogen compressor 68.

As was earlier mentioned, the exhaust fluid may contain carbon monoxide. The second recuperator 54 may be coated with cuprous oxide or zinc oxide for promoting a low temperature WGS reaction in the second recuperator 54. In the low temperature WGS reaction, any remaining carbon monoxide in the exhaust fluid may be converted into carbon dioxide in a manner similar to that described above for the high temperature WGS reaction. In this manner, any remaining carbon monoxide in the exhaust fluid that is not converted into carbon dioxide in the combustion chamber 14 may in turn be converted into carbon dioxide in the second recuperator 54. In addition, unburned fuel emissions such as VOC's may also be converted into carbon dioxide.

Referring still to FIG. 1, a first heat exchanger 92 may be further included in the combustion engine 10 for heating hydrogen 36 prior to the hydrogen 36 being received by the exhaust turbine 56. The first heat exchanger 92 may be placed in thermal contact with an exterior of the combustion chamber 14 such that the first heat exchanger 92 may be heated by heated air leaving the exterior of the combustion chamber 14. In addition, the first heat exchanger 92 may be placed in thermal contact with heated air exiting the first recuperator 52 to allow for additional heating of the first heat exchanger 92. The first heat exchanger 92 may be fluidly connected between the second recuperator 54 and the exhaust turbine 56 such that hydrogen 36 exiting the second recuperator 54 may flow through the first heat exchanger 92. In this manner, the hydrogen 36 may be heated prior to the hydrogen 36 being received by the exhaust turbine 56 in order to improve the operating efficiency of the exhaust turbine 56.

Figure 12:
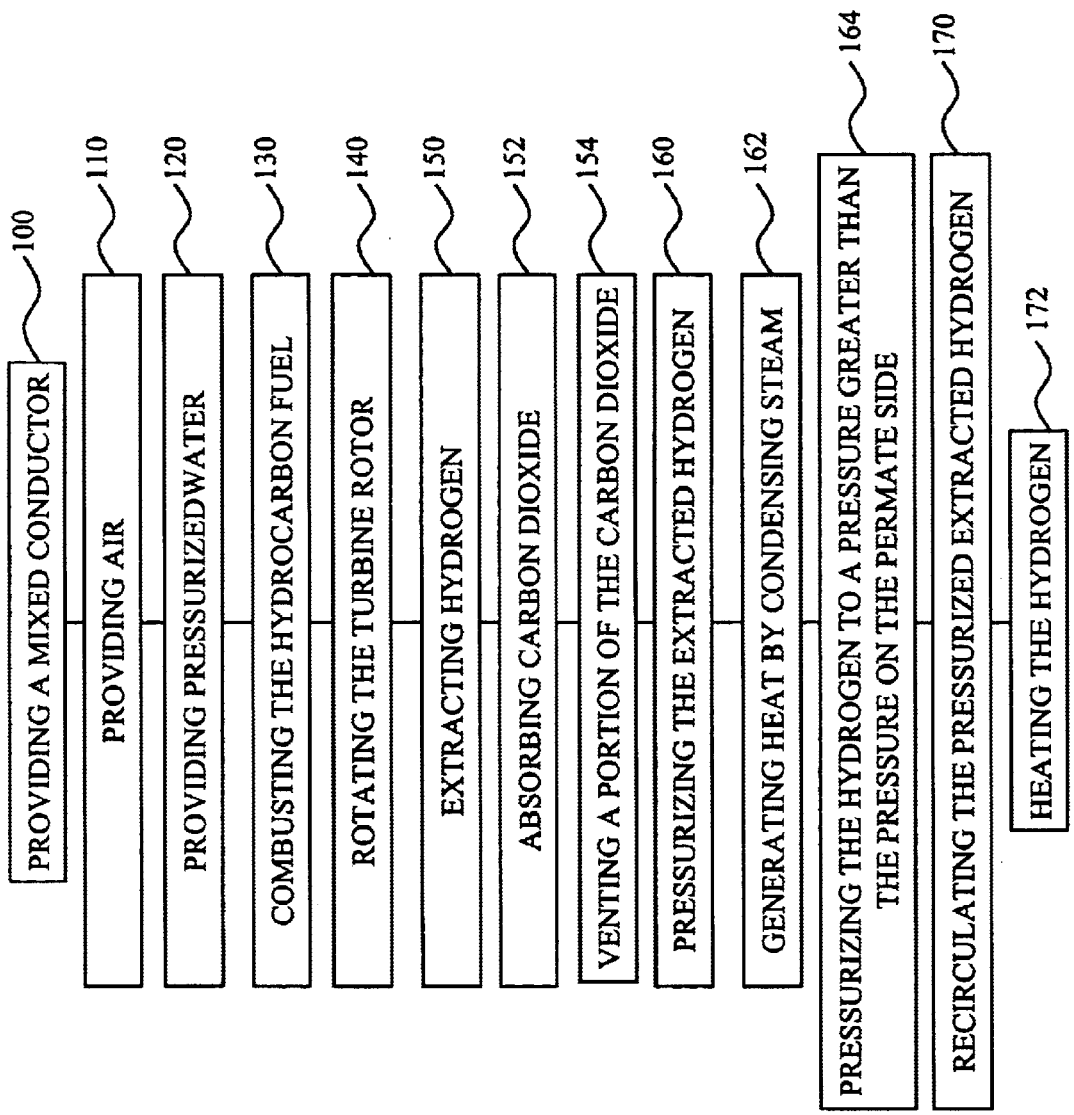
FIG. 12 is a block diagram of a method for operating the combustion engine of the present invention.

The operation of the combustion engine 10 will now be described with reference to FIG. 12. According to another aspect of the present invention, there is provided a method for rotating the turbine rotor of the exhaust turbine 56 utilizing recirculated hydrogen 36 extracted from the exhaust fluid. FIG. 12 shows a block diagram which illustrates steps that may be utilized in the method. The exhaust fluid itself is also circulated through the combustion engine 10 in order to rotate the turbine rotor, as will be described in greater detail below.

Referring to FIG. 12, step 100 of the method includes providing the mixed conductor 16 to the combustion engine 10, as shown in FIG. 1. The mixed conductor 16 has the retentate side 20 and the permeate side 22. As was mentioned earlier, the permeate side 22 is exposed to the combustion chamber 14 while the retentate side 20 is fluidly connected to the air intake port 48. The mixed conductor 16 is configured to conduct oxygen ions in the air from the retentate side 20 to the permeate side 22 when the partial pressure of oxygen on the permeate side 22 is lower than the partial pressure of oxygen on the retentate side 20. As was mentioned above, the heating system 122 may optionally be included and may be placed in thermal contact with the mixed conductor 16 to heat the mixed conductor 16 to increase the conducting efficiency of the mixed conductor 16. In addition, the heating system 122 may include the electrical heating element 124, disposed within the combustion chamber 14 to ignite the residual oxygen-enriched fraction of air that may be formed in the exhaust fluid as a result of incomplete combustion of the hydrocarbon fuel.

Step 110 includes providing the air to the retentate side 20 of the mixed conductor 16. The air intake port 48 provides air to the engine housing 12 in a manner that exposes the retentate side 20 to the air. As shown in FIG. 1, the intake compressor 50 may optionally be included with the combustion engine 10 in order to pressurize the air prior to delivery to the engine housing 12. The air may be heated prior to entering the mixed conductor 16. It is estimated that air enters the mixed conductor 16 at a relatively high temperature of about 1273° K. The air flows at atmospheric pressure along the retentate side 20 of the mixed conductor 16. The mixed conductor 16 is heated as the heated air passes therealong. Due to the differential in partial pressures of oxygen on the retentate side 20 as compared to the permeate side 22, oxygen ions are conducted through the mixed conductor 16 to produce the oxygen-pure fraction of air on the permeate side 22 (i.e. in the combustion chamber 14). Preferably, the air flow rate across the mixed conductor 16 is such that the combustion chamber 14 is provided about 1.5 times the amount of oxygen that is necessary to completely burn the hydrocarbon fuel.

Referring still to FIG. 12, step 120 includes providing the pressurized water to the combustion chamber 14. The water acts as a dilutant to maintain the temperature of the combustion chamber 14 below a melting point of materials from which the combustion chamber 14 may be fabricated. As was earlier mentioned, the water intake port 62 may be fluidly connected to the combustion chamber 14 such that it may provide pressurized water to the combustion chamber 14. As shown in FIG. 1, the first pump may optionally be included with the combustion engine 10 to pressurize the water prior to delivery to the combustion chamber 14. The water intake port 62 may be fluidly connected to the water source 64 such as a water source 64 tank (not shown) that may be disposed adjacent to the combustion chamber 14.

Step 130 includes combusting the hydrocarbon fuel upon a partial pressure of oxygen in the air on the permeate side 22 being lower than the partial pressure of oxygen on the retentate side 20. As was earlier mentioned, such a pressure differential between the retentate side 20 and the permeate side 22 results in the oxygen-pure fraction of the air being provided to the combustion chamber 14. The combustion of hydrocarbon fuel in the combustion chamber 14 continuously depletes the oxygen partial pressure on the permeate side 22 of the mixed conductor 16. Such continual depletion of oxygen provides a driving force for oxygen to be conducted through the mixed conductor 16 from the retentate side 20 (i.e., an exterior side of the combustion chamber 14 at atmospheric pressure) to the permeate side 22 (i.e., inside the combustion chamber 14 which is estimated to be at about 217 atmospheres of pressure. The rate at which oxygen may be conducted through the mixed conductor 16 is proportional to the difference in partial pressures of oxygen. Thus, the mixed conductor 16 may be sized and configured to allow oxygen to enter the combustion chamber 14 in proportion to a rate at which hydrocarbon fuel is combusted. The iron oxide catalyst (not shown) may be disposed within the combustion chamber 14 to promote a high temperature water-gas shift (WGS) reaction wherein a portion of the carbon monoxide in the exhaust fluid reacts with water in the exhaust fluid and is converted into carbon dioxide.

Referring still to FIG. 12, step 140 involves the expansion of the exhaust fluid within the exhaust turbine 56 which causes the turbine rotor to rotate for producing mechanical energy. The exhaust fluid flows from the combustion chamber 14 to the exhaust turbine inlet 58. The exhaust turbine inlet 58 receives the exhaust fluid from the combustion chamber 14 and delivers the exhaust fluid to the turbine rotor. The turbine rotor is configured to rotate upon expansion of the exhaust fluid that is received from the exhaust turbine inlet 58. The exhaust turbine outlet 60 receives the expanded exhaust fluid from the turbine rotor. The exhaust turbine 56 converts thermal energy of the expanding exhaust fluid into mechanical energy. The rotating turbine rotor may be utilized to perform useful work such as to turn an electricity generator.

Figure 13:
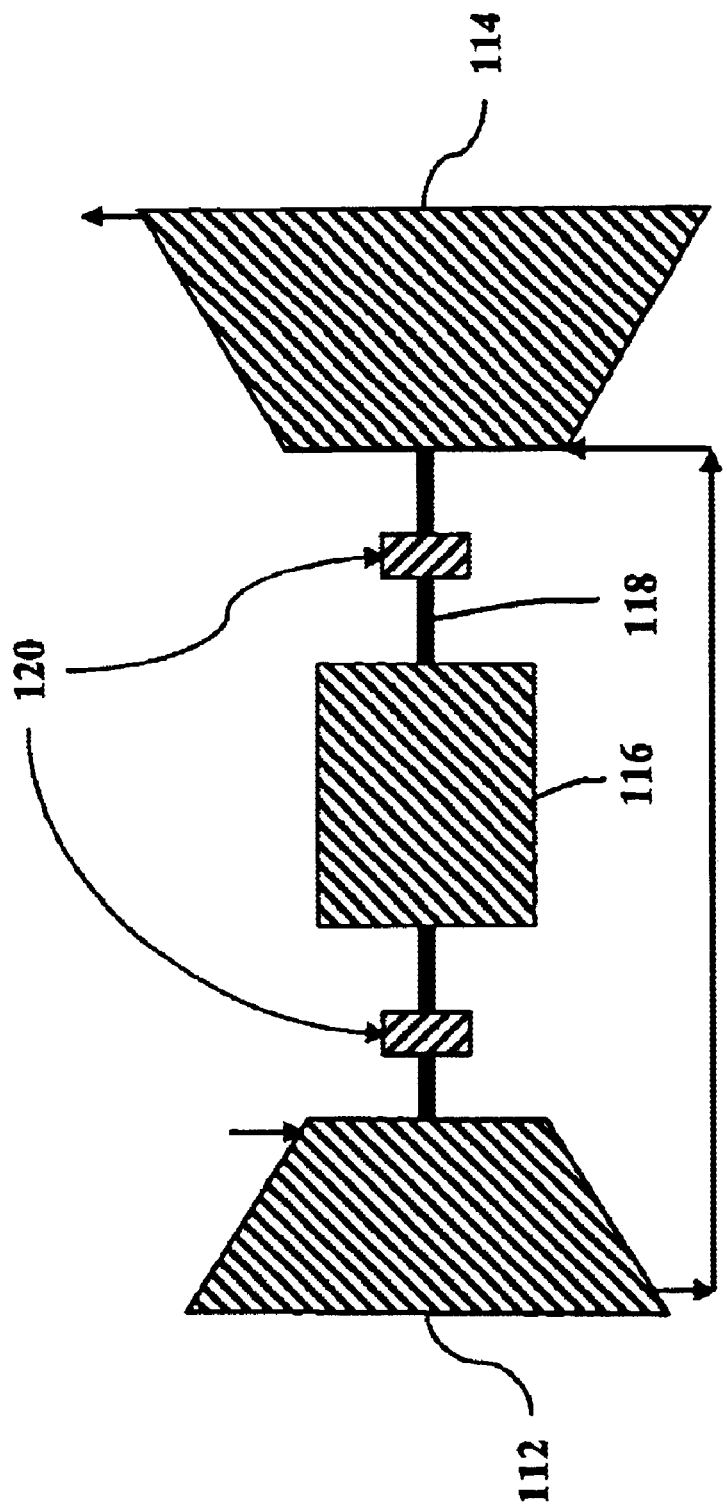
FIG. 13 shows a first and second stage turbine coupled to a generator disposed between the first and second stage turbines as may be included with the combustion engine of the present invention.

As may be seen in FIG. 13, the combustion engine 10 may be further comprised of a first turbine 112 coupled to a second turbine 114 to turn a generator 116 disposed between the first and second stage turbines 112, 114. Foil bearings 120 may be utilized to support a shaft 118 that mechanically couples the first and second stage turbines 112, 114 together. In addition, the first and second stage turbines 112, 114 may be fluidly connected such that exhaust fluid expanded through the first turbine 112 may then flow to the second turbine 114 before being received by the hydrogen compressor assembly 66, as will be described in greater detail below.

In step 150, the hydrogen 36 is extracted from the expanded exhaust fluid when the exhaust fluid is routed through the hydrogen compressor assembly 66. As can be seen in FIG. 1, the hydrogen compressor assembly 66 may be comprised of the first metal hydride hydrogen compressor 68, the gas absorber 84 and the second metal hydride hydrogen compressor 76 cooperating together to process the exhaust fluid. Each one of the first and second metal hydride hydrogen compressors 68, 76 contains metal hydride material that is alternately heated and cooled to extract hydrogen 36 from the exhaust fluid. The first metal hydride hydrogen compressor 68 condenses the steam in the exhaust fluid and adsorbs a portion of the hydrogen 36 in the exhaust fluid, as is described in greater detail below The extraction of the hydrogen 36 in step 150 may further comprise steps 152 and 154. Step 152 includes absorbing the carbon dioxide into the water contained in the exhaust fluid. Step 154 includes venting a portion of the carbon dioxide to atmosphere or collecting and storing the portion of the carbon dioxide. The gas absorber 84 receives the exhaust fluid and the hydrogen 36 from the first metal hydride hydrogen compressor 68. The gas absorber 84 allows the water in the exhaust fluid to absorb the carbon dioxide in the exhaust fluid. The second metal hydride hydrogen compressor 76 adsorbs a portion of the hydrogen 36 and vents a portion of the carbon dioxide to atmosphere.

Figure 8A:
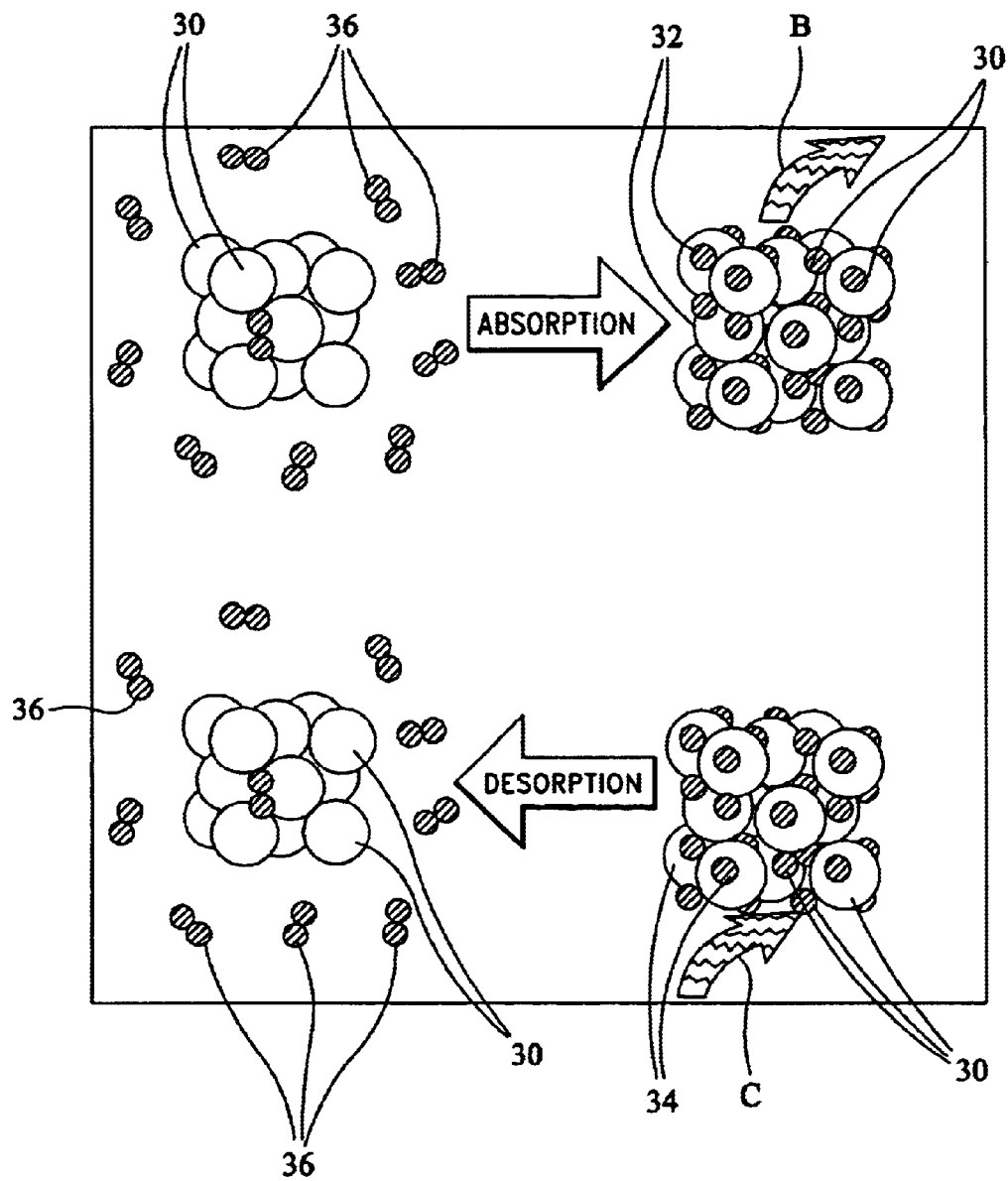
FIG. 8a is a schematic diagram of a metal hydride material illustrating the manner in which hydrogen is absorbed and desorbed therefrom.
Figure 8B:
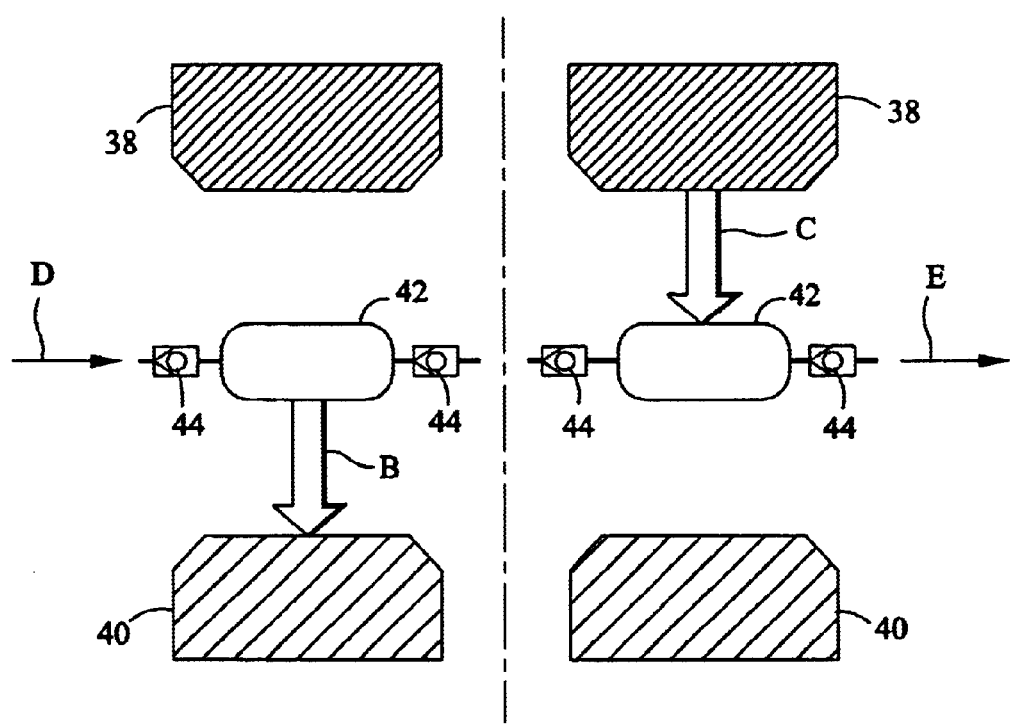
FIG. 8b is a is a schematic diagram of a metal hydride hydrogen compressor of the combustion engine and illustrating its operation in pressurizing hydrogen extracted from the exhaust fluid.

Referring briefly now to FIGS. 8a and 8b, the operation of the first and second metal hydride hydrogen compressors 68, 76 will be described. The diagram shown in FIG. 8a illustrates the principle upon which metal hydride material in the first and second metal hydride hydrogen compressors 68, 76 absorbs and desorbs the hydrogen 36. The metal hydride material may be configured as metal crystal 30, as is shown in FIG. 8a. Each one of the first and second metal hydride hydrogen compressors 68, 76 includes such metal crystal 30. The metal crystal 30 is an alloy that reacts when in the presence of hydrogen 36 such that the metal crystal 30 absorbs the hydrogen 36 and forms expanded metal hydride crystal 32.

As shown in FIG. 8a, when the hydrogen 36 is absorbed into the metal crystal 30, heat is produced. The heat, indicated by the arrow B, leaves the expanded metal hydride crystal 32, reducing the kinetic energy of the hydrogen 36. Conversely, when the metal hydride crystal 34 is heated, energy is required to desorb the hydrogen 36 therefrom. As is shown in FIG. 8a, arrow C represents heat entering the metal hydride crystal 34. The consumption of energy required to desorb the hydrogen 36 from the metal crystal 30 is analogous to the latent heat of evaporation resulting from a phase change of a liquid to a gas or the heat of sublimation resulting from a phase change of dry ice from a solid to a gas. By alternating the heating and cooling of the metal crystal 30 in each one of the first and second metal hydride hydrogen compressors 68, 76, hydrogen 36 may be initially extracted from the exhaust fluid and then desorbed from the metal crystal 30 to form hydrogen 36 as a gas.

In step 160 of FIG. 12, the extracted hydrogen 36 may be pressurized. The pressurization of the hydrogen 36 may occur simultaneous with the extraction of the hydrogen 36 described above in step 150. The pressurization of the extracted hydrogen 36 may further include steps 162 and 164. Step 162 includes generating heat by condensing steam in the exhaust fluid. Step 164 includes pressurizing the hydrogen 36 to a pressure greater than the pressure on the permeate side 22 of the combustion chamber 14 by using heat of condensation of the steam. Referring briefly to FIG. 8b, shown is a diagram illustrating the principle upon which the first and second metal hydride hydrogen compressors 68, 76 pressurize the hydrogen 36 to a higher pressure using heat. Each one of the first and second metal hydride hydrogen compressors 68, 76 further includes a heat source 38 and a heat sink 40.

The metal crystal 30 may be contained in a hydride container 42 in each one of the first and second metal hydride hydrogen compressors 68, 76. The hydride container 42 may have a check valve 44 on each side thereof, as is shown in FIG. 8b. The check valve 44s restricts the flow of hydrogen 36 to one direction only. Initially, hydrogen 36 passes through the check valve 44 and enters the hydride container 42. The metal crystal 30 in the hydride container 42 absorbs hydrogen 36 producing heat, as was mentioned above. The heat generated flows from the hydride container 42 and into the heat sink 40 along the direction indicated by the arrow B in FIG. 8b. In this manner, the expanded metal hydride crystal 32 and, hence, the hydride container 42 cools as the hydrogen 36 is absorbed.

Referring still to FIG. 8b, following the cooling of the expanded metal hydride crystal 32 and absorption of the hydrogen 36 thereinto, the metal hydride crystal 34 is then heated such that the hydrogen 36 is discharged or desorbed therefrom at a higher pressure. In FIG. 8b, heat flows from the heat source 38 and enters the hydride container 42 as indicated by the arrow C. The steam condensing in the first and second metal hydride hydrogen compressors 68, 76 provides the heat to the hydride container 42. As the heat enters the metal crystal 30 in the hydride container 42, the metal crystal 30 contracts in the manner described above. As the metal crystal 30 contracts, the hydrogen 36 is forced out past the check valve 44 at a higher pressure as indicated by the arrow E in FIG. 8b. The pressure at which the hydrogen 36 leaves the hydride container 42 is greater than the pressure at which the hydrogen 36 enters the hydride container 42.

In step 170, the pressurized extracted hydrogen 36 may recirculate through the exhaust turbine 56 to improve the operating efficiency of the combustion engine 10 as mentioned above. Step 170 may additionally include step 172 of heating the pressurized extracted hydrogen 36 by recirculating the hydrogen 36 along the retentate side 20 of the mixed conductor 16 during combustion of the hydrocarbon fuel. In addition, the second recuperator 54 and the first heat exchanger 92 may also be utilized to heat the recirculating hydrogen 36 before the hydrogen 36 is received by the exhaust turbine inlet 58. As was earlier mentioned, the second recuperator 54 cross-circulates exhaust fluid from the exhaust turbine outlet 60, condensed steam from the first water pump 72, and the portion of the hydrogen 36 from the first metal hydride hydrogen compressor 68, as is illustrated in FIG. 1.

By cross-circulating such fluids in the second recuperator 54, heat may be exchanged between the exhaust fluid, the condensed steam and the portion of the hydrogen 36. In this manner, the portion of the hydrogen 36 that is received from the first metal hydride hydrogen compressor 68 may be heated prior to delivery to the exhaust turbine 56. Simultaneously, the hydrogen 36 from the exhaust turbine 56 may be cooled prior to delivery to the first metal hydride hydrogen compressor 68. The first heat exchanger 92 may also heat the hydrogen 36 before the hydrogen 36 is received by the exhaust turbine inlet 58. The first heat exchanger 92 may be heated by heated air leaving the exterior of the combustion chamber 14 and with heated air leaving the first recuperator 52. In addition, the hydrogen 36 leaving the second recuperator 54 may flow through the first heat exchanger 92 in order to heat the hydrogen 36 prior to the hydrogen 36 being received by the exhaust turbine 56.

Figure 2:
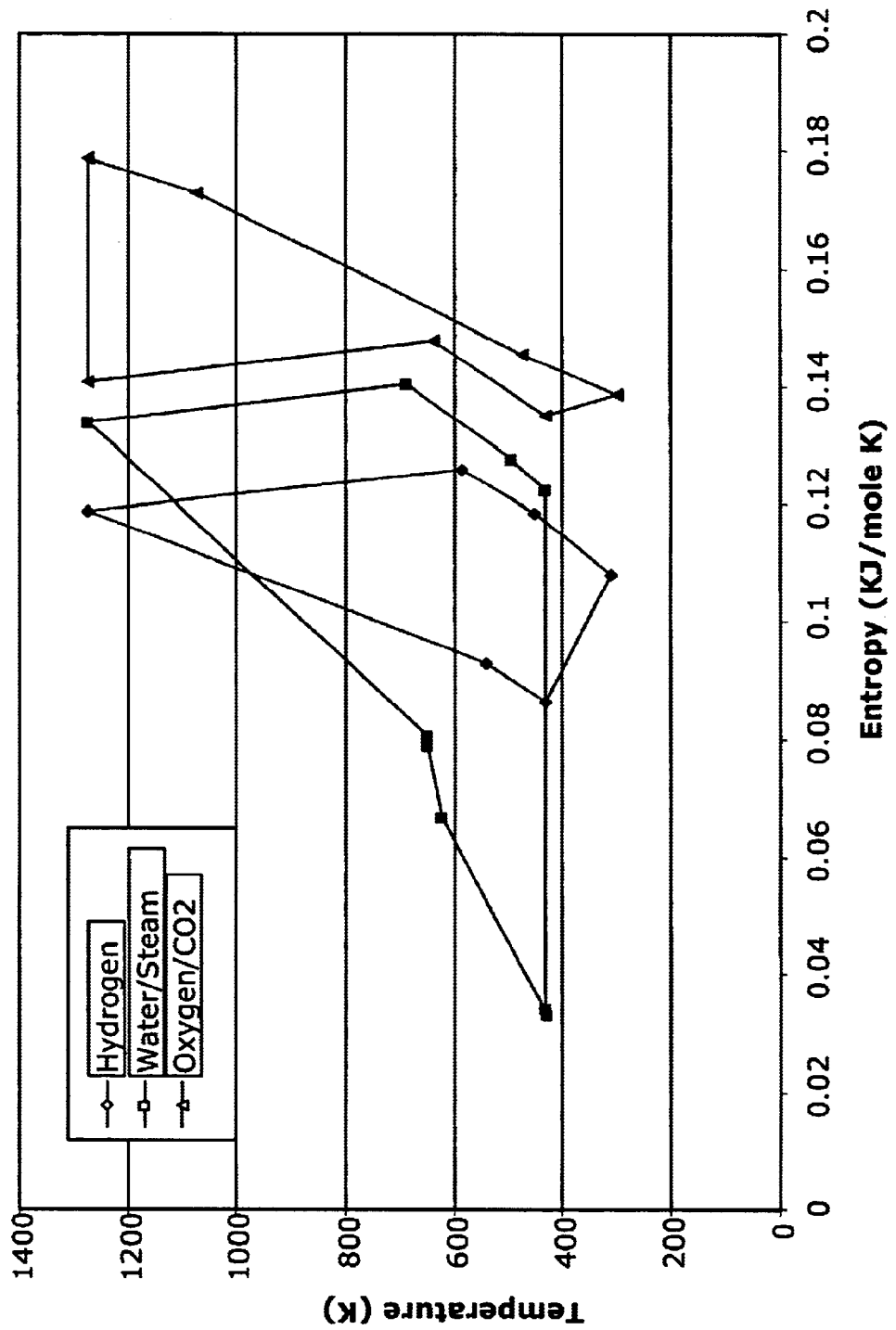
FIG. 2 is a graph of entropy vs. temperature for a complete cycle of the combustion engine.

Referring now to FIG. 2, shown is a graph of entropy vs. temperature for a complete cycle of the combustion engine 10 of the present invention. More specifically, FIG. 2 illustrates the respective thermodynamic cycles of the water/steam, hydrogen 36 and oxygen/carbon dioxide during the complete cycle for the case wherein the hydrocarbon fuel is octane. Using octane as the hydrocarbon fuel, it has been calculated that the thermal efficiency for the complete cycle is over 60 percent. A similar calculation using methane as the hydrocarbon fuel results in an efficiency of about 57 percent. The lower efficiency of the combustion engine 10 using methane instead of octane is a result of the lower heating value of methane. It further estimated that using a mixed conductor 16 having a size of about 9 inches in length, about 9 inches in width and about 4 inches thick, the oxygen permeation through the mixed conductor 16 is sufficient to allow the combustion engine 10 to produce about seventy-one horsepower of work.

Figure 4:
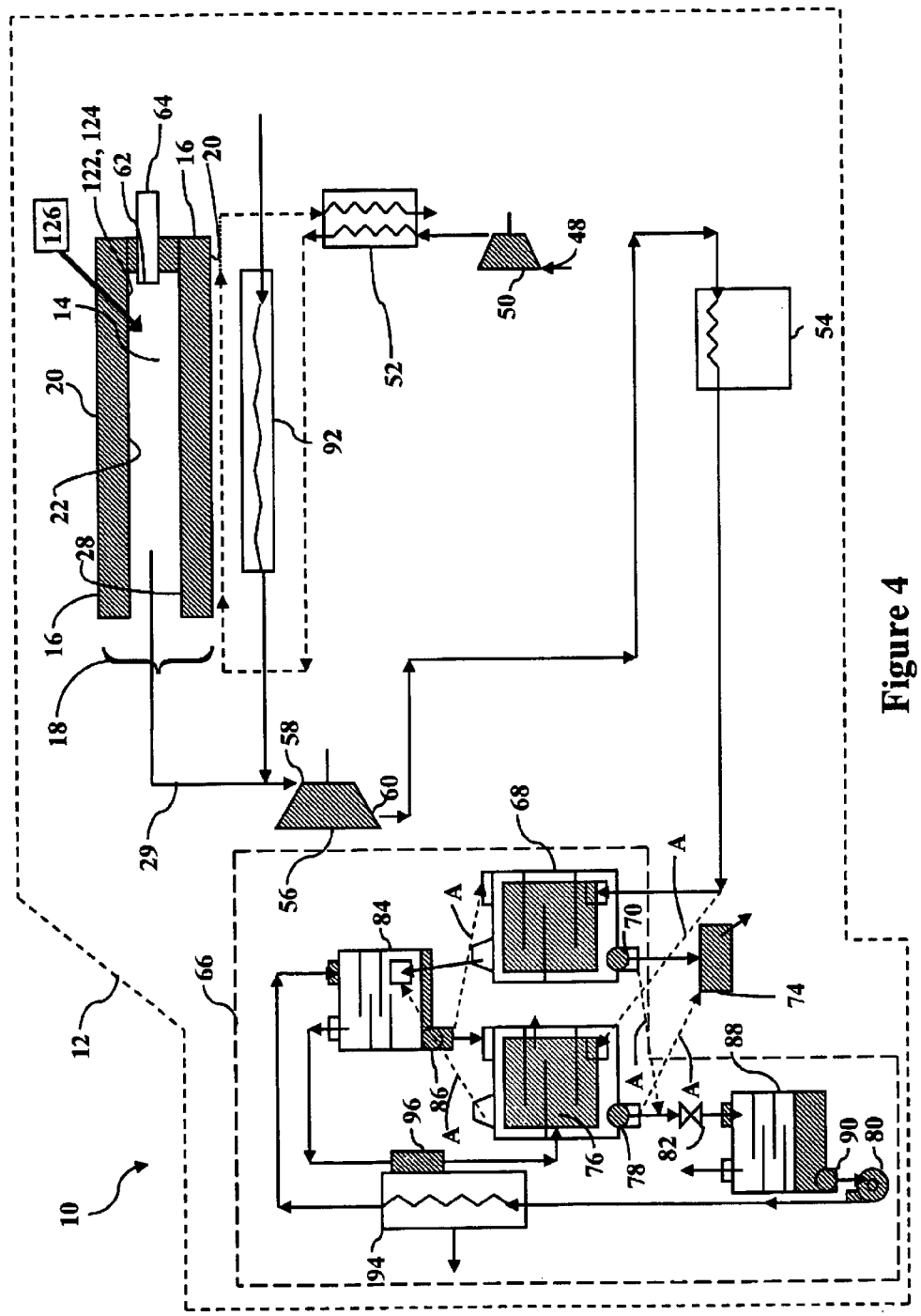
FIG. 4 is a schematic diagram of the combustion engine illustrating a flow path of oxygen and carbon dioxide circulating through the combustion engine.

Referring to FIG. 4, shown is a schematic diagram of the combustion engine 10 illustrating a flow path of oxygen and carbon dioxide through the combustion engine 10. As was earlier mentioned, air is initially drawn into the air intake. For purposes of calculating the efficiency of the combustion engine 10, it will be assumed that the air entering the air intake is at a temperature of about 300° K. The air entering the air intake may be pressurized by the intake compressor 50, if included, to a compression ratio of about 2.5:1. The air then flows to the first recuperator 52, if included, wherein it may be heated by heated air that is leaving the mixed conductor 16.

In FIG. 4, the heated air enters the mixed conductor 16 at a relatively high temperature of about 1273° K. The air flows at atmospheric pressure along the mixed conductor 16 on the retentate side 20. The mixed conductor 16 is heated as the heated air passes therealong. Due to the differential in partial pressures of oxygen on the retentate side 20 as caused by the continuous oxygen depletion inside the combustion chamber 14, oxygen ions are conducted through the mixed conductor 16 such that the oxygen-pure fraction of air is produced on the permeate side 22. The air flow rate across the mixed conductor 16 is preferably such that about 1.5 times the amount of oxygen that is necessary to completely burn the hydrocarbon fuel is present on the retentate side 20.

Hence, the heated air leaving the mixed conductor 16 still has about half a normal concentration of oxygen in air (i.e., about 21% oxygen by volume of air). The air must overcome an approximate 15 psi pressure drop across the mixed conductor 16 before passing through the first recuperator 52. In the first recuperator 52, the heated air exiting the mixed conductor 16 cross-circulates with air entering the first recuperator 52 from the air intake. In this manner, the air from the air intake may be heated. The heated air flowing out of the first recuperator 52 may be discharged into the atmosphere with substantially no pollution present except for a small amount of $NO_x$. The hydrocarbon fuel is provided to the combustion chamber 14. In the above described combustion process, hydrocarbon fuel combusts with the oxygen-pure fraction of air. Due to the continuous combustion of hydrocarbon fuel in the combustion chamber 14, the temperature of the combustion chamber 14 tends to increase over time such that the temperature limit of material used to fabricate the combustion chamber 14 may eventually be exceeded. Therefore, the water is added to restrict the temperature in the combustion chamber 14.

Figure 6:
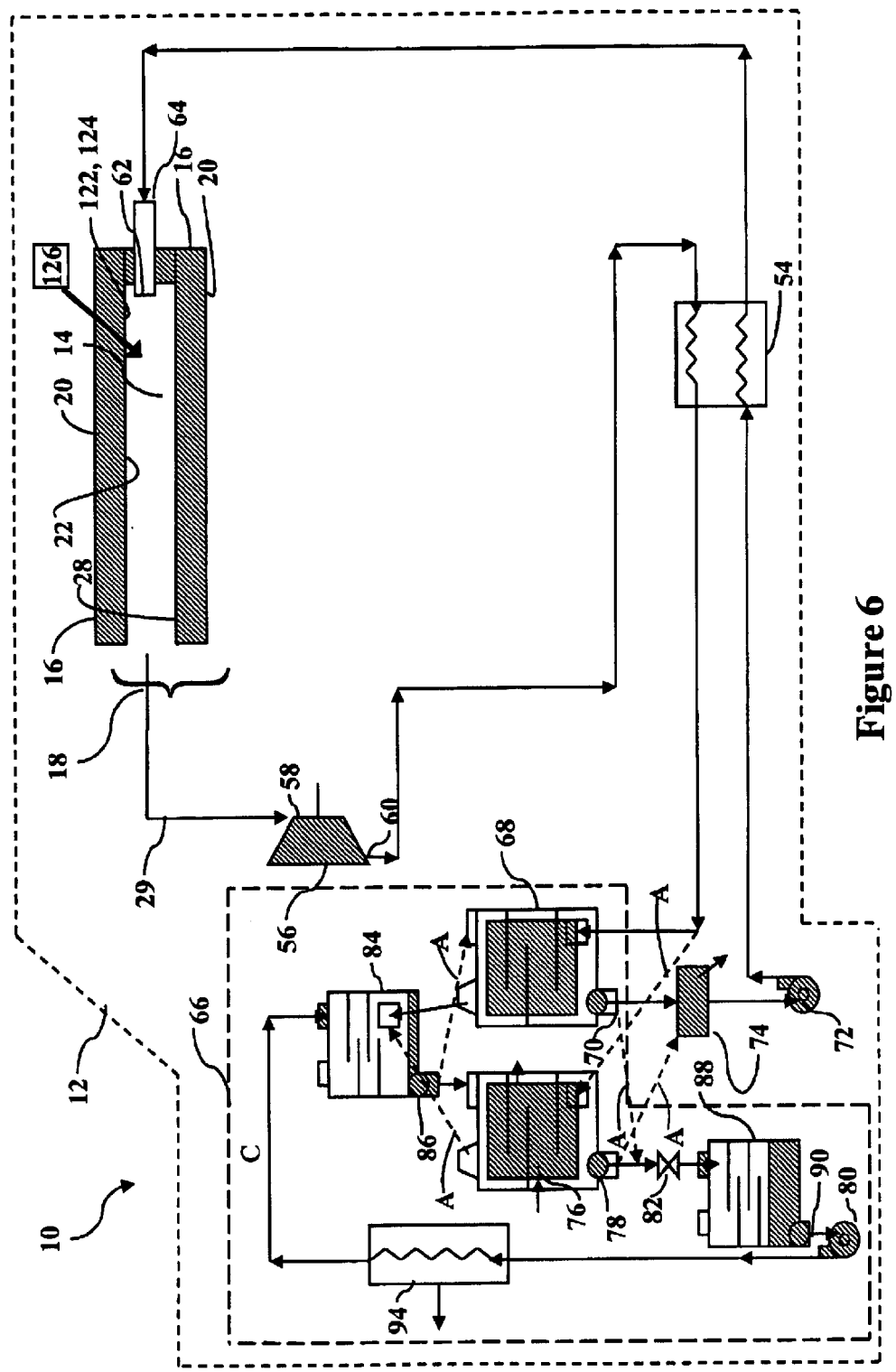
FIG. 6 is a schematic diagram of the combustion engine illustrating a flow path of water and condensed steam circulating through the combustion engine.

Referring briefly to FIG. 6, the water may be provided to the combustion chamber 14 by the water intake port 62. The water may act as a dilutant in order to keep the combustion temperature below material melting limits. The combustion process may convert at least a portion of the water into steam. If the iron oxide catalyst is included in the combustion chamber 14, the steam in the exhaust fluid may aid in converting carbon monoxide into carbon dioxide in the high temperature WGS reaction described above. As is shown in FIG. 6, the steam and water in the exhaust fluid then circulate through the combustion engine 10.

The steam and water enter the exhaust turbine 56 at the exhaust turbine inlet 58 where the steam may expand. The expanding steam may contribute to the rotation of the turbine rotor and increase the work output of the exhaust turbine 56. The expanded steam then passes to the second recuperator 54. If cuprous oxide or zinc oxide is included in the second recuperator 54, the steam may aid the low temperature WGS reaction to further eliminate any residual carbon monoxide in a manner similar to that described above for the high temperature WGS reaction. The steam then passes from the second recuperator 54 and into the hydrogen compressor assembly 66, as is shown in FIG. 6.

In the hydrogen compressor assembly 66, the steam in the exhaust fluid condenses. The heat from the condensing steam heats up the hydrogen compressor assembly 66. The dashed arrows, indicated as A in FIG. 6, represent alternate paths for the exhaust fluid between the first and second metal hydride hydrogen compressors 68, 76. The latent heat of condensation of the steam aids the metal hydride material in the hydrogen compressor assembly 66 to extract and pressurize the hydrogen 36 in the exhaust fluid in the manner described above. The condensation of the steam results in water. The water (i.e., condensed steam) exits the first metal hydride hydrogen compressor 68 through the first compressor valve 70. The water then enters the water tank 74 where it may optionally be expelled from the combustion engine 10, as is shown in FIG. 6.

Figure 7:
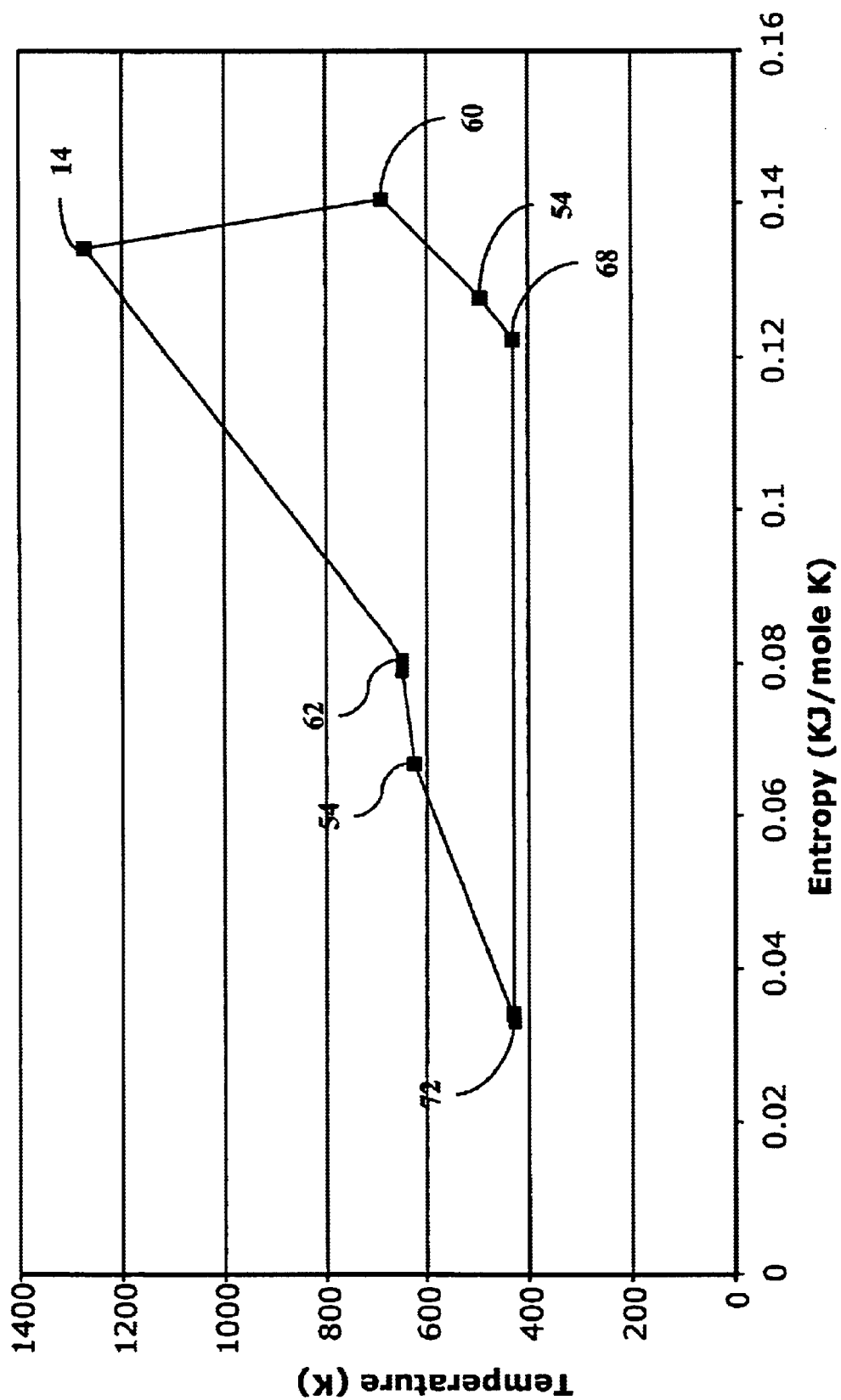
FIG. 7 is a graph of entropy vs. temperature for the water illustrating changes in enthalpy of the water as it circulates through the combustion engine.

Alternatively, the water may be received by the first water pump 72, as is shown in FIG. 1. The first water pump 72, if included, pressurizes the water pressure up to about 217 atmospheres before the water is then received by the second recuperator 54. In the second recuperator 54, the water may be heated before flowing to the water intake port 62. The cycle may be repeated as the water is again provided to the combustion chamber 14. FIG. 7 illustrates the thermodynamic states for the steam and water. More specifically, FIG. 7 is a graph of entropy vs. temperature for the water illustrating changes in enthalpy of the water as it circulates through the combustion engine 10. The element numerals on the graph correspond to the above-described components of the combustion engine 10. In this regard, the element numerals provide an indication of the entropy of the water at each of the respective components through which the water is passing.

Referring back to FIG. 4, carbon dioxide in the exhaust fluid is absorbed into the water. The hydrogen 36 is withdrawn from an upper end of the first metal hydride hydrogen compressor 68 such that the hydrogen 36 flows to the gas absorber 84. At the gas absorber, carbon dioxide from exhaust fluid is absorbed into cooling water entering the gas absorber 84 at an upper end thereof. The cooling water then flows out of the gas absorber 84 through the gas absorber valve 86. The hydrogen 36 that results from the low and high temperature WGS reactions exits the gas absorber 84 at the upper end of the gas absorber 84. The hydrogen 36 then flows from the gas absorber 84 and into the desiccant 96.

The desiccant 96 removes moisture from the hydrogen 36 before the hydrogen 36 is received by the second metal hydride hydrogen compressor 76. In the second metal hydride hydrogen compressor 76, any remaining carbon dioxide may be vented to atmosphere. A portion of the carbon dioxide may be vented out of the second metal hydride hydrogen compressor 76 at a pressure of about 5.4 atmospheres. Alternatively, the carbon dioxide may be vented to a storage container or to a recycling process. In the gas absorber 84, the water containing absorbed carbon dioxide passes through the the gas absorber valve 86. The water from the gas absorber 84 enters the second metal hydride hydrogen compressor 76. The water flows out of the second metal hydride hydrogen compressor 76 through the second compressor valve 78.

The water then passes through the throttling valve 82 where it expands to atmospheric pressure. The water then enters through desorber inlet and passes into the gas desorber 88. In the gas desorber 88, carbon dioxide may be vented to the atmosphere or the carbon dioxide may be collected and stored, in a manner similar to that described above for the second metal hydride hydrogen compressor 76. The water exits the gas desorber 88 by passing through the gas desorber valve 90 to the second water pump 80. The second water pump 80 pressurizes the water such that the water flows to the second heat exchanger 94. The water is air cooled in the second heat exchanger 94. The cooled water then passes to the gas absorber 84 to aid in cooling the gas absorber 84.

Figure 5:
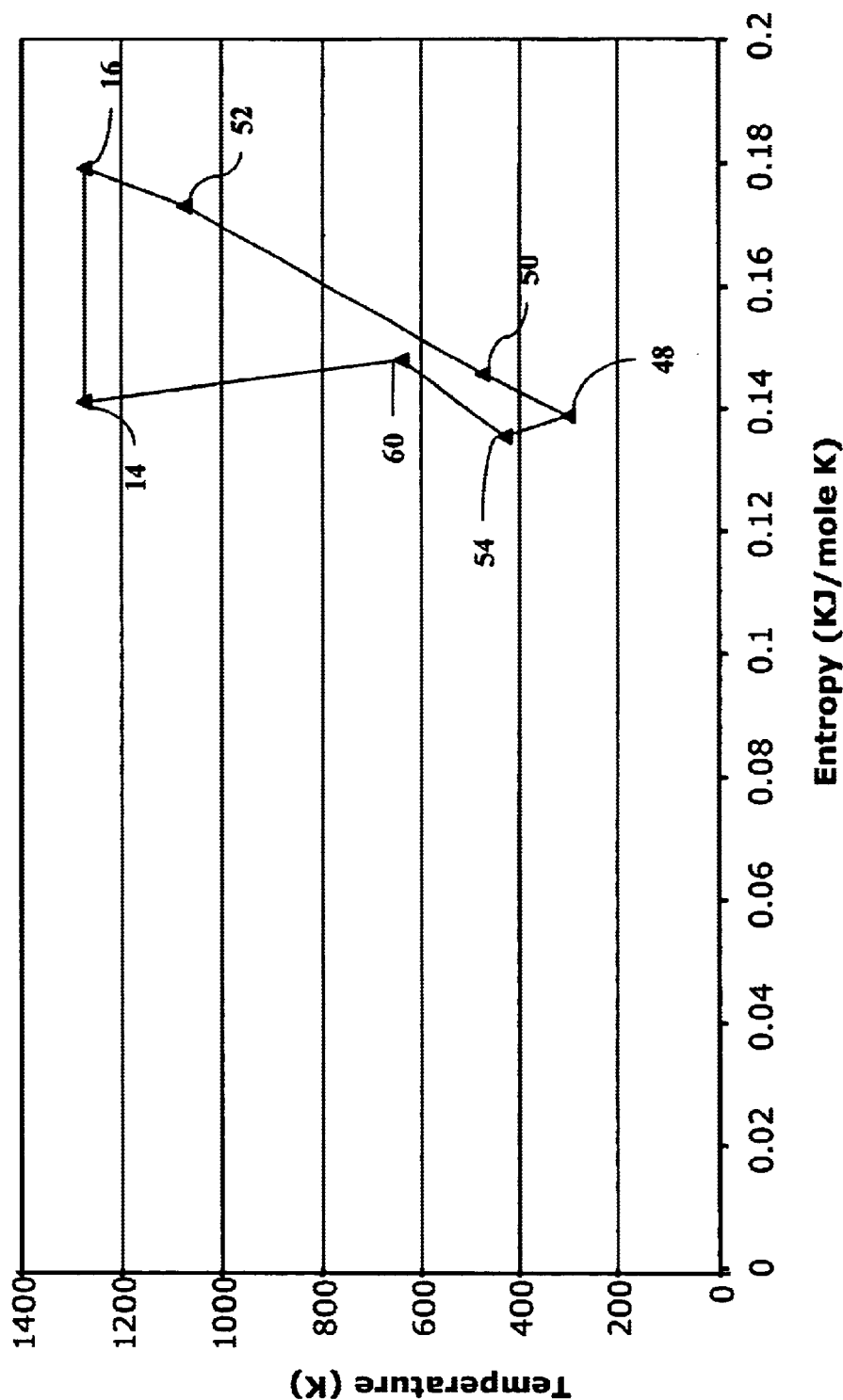
FIG. 5 is a graph of entropy vs. temperature for the oxygen illustrating changes in enthalpy of the oxygen as it combusts and expands while circulating through the combustion engine.

FIG. 5 is a graph of entropy vs. temperature for the above-described cycle of the oxygen and the carbon dioxide flowing through the combustion engine 10 as shown in FIG. 4. More specifically, FIG. 5 illustrates the respective thermodynamic states of the oxygen and the carbon dioxide during a complete cycle of the combustion engine 10 for the case wherein the hydrocarbon fuel is octane. As was mentioned above, the element numerals on the graph correspond to the above-described components of the combustion engine 10 and provide an indication of the entropy of the oxygen and the carbon dioxide flowing through the combustion engine 10 at each of the respective components.

Figure 9:
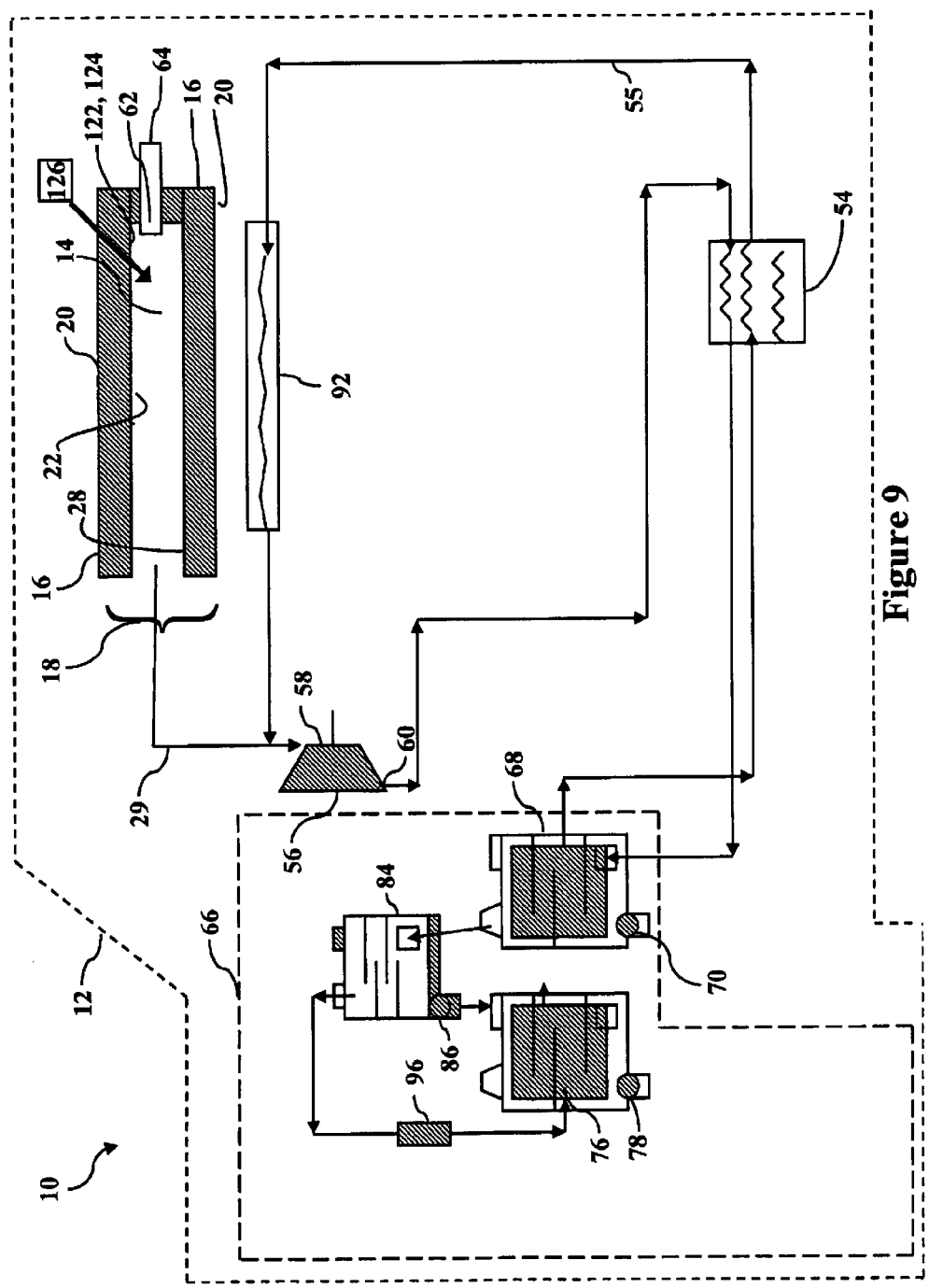
FIG. 9 is a schematic diagram of the combustion engine illustrating a flow path of the hydrogen as it circulates through the combustion engine.

Referring now to FIG. 9, shown is a schematic diagram of the combustion engine 10 illustrating a flow path of the hydrogen 36 as it circulates through the combustion engine 10. The hydrogen 36 acts as a working fluid as it cycles through the combustion engine 10 exploiting energy from the condensing steam. The metal hydride material in the hydrogen compressor assembly 66 uses the energy from the condensing steam to pressurize the hydrogen 36 in a manner described above and as is illustrated in FIGS. 8a and 8b. As can be seen in FIG. 9, the first heat exchanger 92 is in thermal contact with the combustion chamber 14. The hydrogen 36 flows through the first heat exchanger 92 wherein the hydrogen 36 is heated. Advantageously, hydrogen 36 has the highest heat capacity per unit weight of any gas. In addition, hydrogen 36 has a heat of transmission coefficient that is four times greater than air. Such properties make hydrogen 36 extremely well suited as a heat exchanger fluid. After passing through the first heat exchanger 92, the heated hydrogen 36 enters the exhaust turbine 56 at the exhaust turbine inlet 58.

Referring still to FIG. 9, the hydrogen 36 expands through the exhaust turbine 56 causing the turbine rotor to rotate providing useful work. After exiting the exhaust turbine 56 at the exhaust turbine outlet 60, the hydrogen 36 passes to the second recuperator 54 where the hydrogen 36 is cooled. The cooled hydrogen 36 then enters the first metal hydride hydrogen compressor 68. The hydrogen 36 rises up through the first metal hydride hydrogen compressor 68 and flows into the gas absorber 84. Because the solubility of hydrogen 36 in water is much lower than the solubility of carbon dioxide in water, the hydrogen 36 also rises up through the gas absorber 84 and exits the gas absorber 84 at an upper end of the gas absorber 84. The hydrogen 36 then flows through the desiccant 96 wherein the hydrogen 36 is dried of moisture before entering the second metal hydride hydrogen compressor 76. The cooling water flowing from the second heat exchanger 94 passes through the gas absorber 84 and enters the second metal hydride hydrogen compressor 76 in order to cool the second metal hydride hydrogen compressor 76. The cooled second metal hydride hydrogen compressor 76 then absorbs the hydrogen 36 and releases the heat of absorption with the hydrogen 36 being maintained at a lower operating pressure of about 5.4 atmospheres, as was earlier described.

A pressure relief valve (not shown) can help to regulate the operating pressure of the hydrogen 36 at about 5.4 atmospheres. Advantageously, such an operating pressure of the hydrogen 36 may promote the steam in the exhaust fluid to condense at a higher temperature of about 155° C. The relatively higher condensation temperature allows the relatively cooler second metal hydride hydrogen compressor 76 to release the hydrogen 36 at a higher pressure, further increasing the efficiency of the combustion engine 10. After the cooled second metal hydride hydrogen compressor 76 is heated by the condensing steam, the compressed hydrogen 36 then flows to the second recuperator 54 where it is heated in a manner as was earlier described. The heated hydrogen 36 then flows through the first heat exchanger 92 and into the exhaust turbine 56 wherein the cycle starts again.

Figure 10:
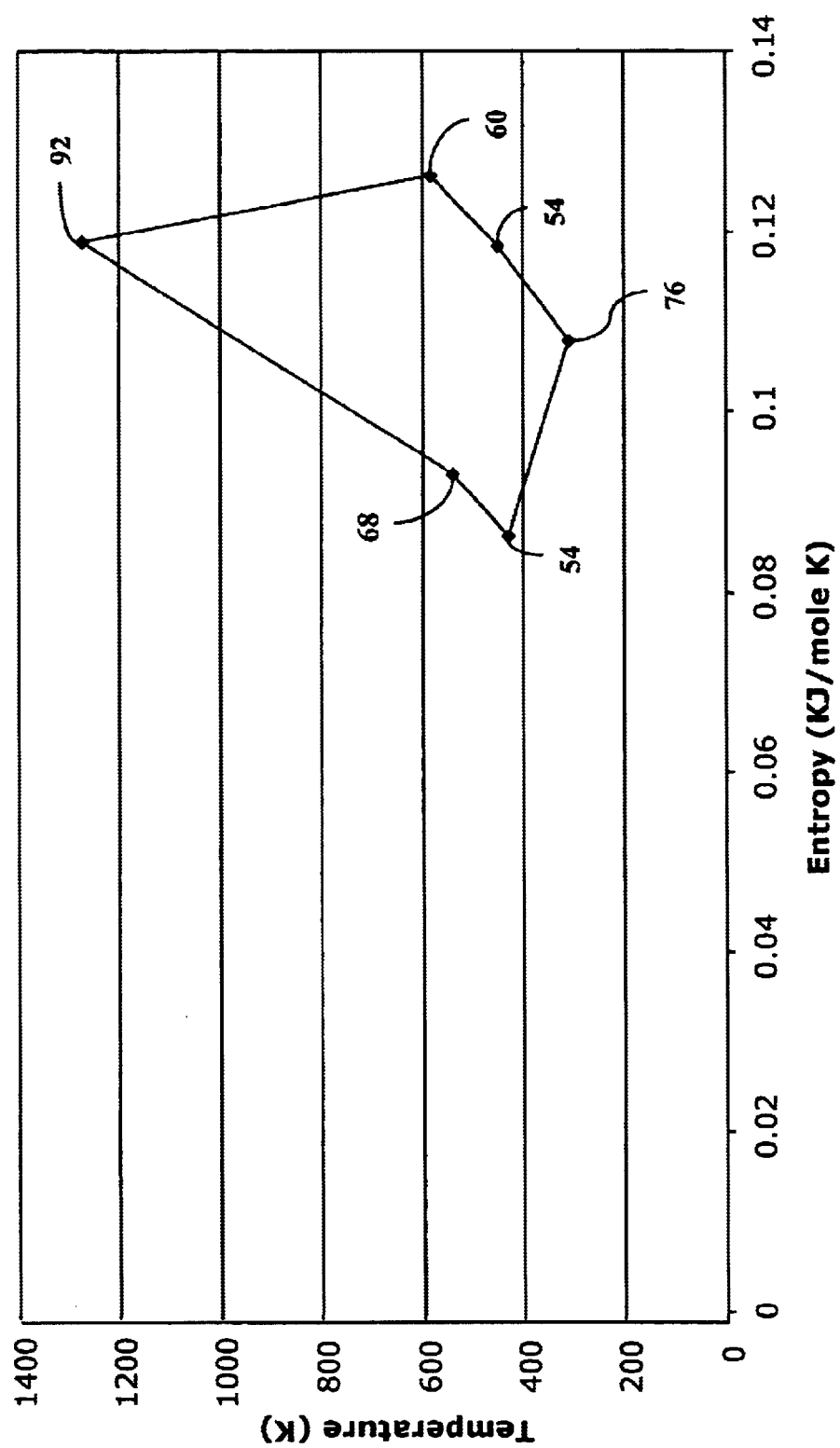
FIG. 10 is a graph of entropy vs. temperature for the hydrogen illustrating changes in enthalpy of the hydrogen as it circulates through the combustion engine.

FIG. 10 is a graph of entropy vs. temperature for the above-described cycle of the hydrogen 36 flowing as it flows through the combustion engine 10 as shown in FIG. 9. More specifically, FIG. 10 illustrates the respective thermodynamic states of the hydrogen 36 during a complete cycle for the case wherein the hydrocarbon fuel is octane. As in the previous graphs illustrated in FIGS. 5 and 7, the element numerals on the graph of FIG. 10 correspond to the above-described components of the combustion engine 10 and provide an indication of the entropy of the hydrogen 36 as it flows through the combustion engine 10 at each of the respective components.

Referring now to FIG. 11, shown is a schematic diagram of a flow path of hydrogen 36 through the combustion engine 10 in an alternative embodiment having the nickel metal hydride battery 102. The nickel metal hydride battery 102 may be a segmented nickel metal hydride battery 102. The flow path of hydrogen 36 in FIG. 11 is similar to the flow path of hydrogen 36 shown in FIG. 9 and as was earlier mentioned. As can be seen in FIG. 11, the nickel metal hydride battery 102 may be fluidly connected to a first control valve 100 which may be operative to regulate the flow of hydrogen 36 from the first accumulator 98 to the nickel metal hydride battery 102. The first control valve 100 may further be operative to regulate the flow of hydrogen 36 from the first accumulator 98 to the second metal hydride hydrogen compressor 76. The nickel metal hydride battery 102 may include a positive electrode 104 and a negative electrode 106 such that power may be supplied to systems such as to other batteries for power storage.

Referring now to FIG. 13, shown is a first and second stage turbine 112, 114 coupled to a generator 116 by a shaft 118 extending between the first and second turbine 112, 114. As can be seen, the generator 116 is disposed between the first and second stage turbines 112, 114. The combination of the first and second turbine 112, 114 with the generator 116 may be utilized for relatively small-scale electrical power production. The first turbine 112 may be fluidly connected to the combustion chamber 14 similar to the manner in which the exhaust turbine 56 is fluidly connected to the combustion chamber 14 as shown in FIG. 1. The second turbine 114 may be fluidly connected to the second recuperator 54. Exhaust fluid may flow from the combustion chamber 14 to the first turbine 112 where it expands therein to turn the shaft 118 and, hence, the generator 116.

After the exhaust fluid expands in the first turbine 112, the exhaust fluid flows to the second turbine 114 wherein it further expands. By coupling the first turbine 112 to the second turbine 114, an expansion ratio of 40:1 may be achieved. The shaft 118 may be supported by a pair of foil bearings 120 as can be seen in FIG. 13. The foil bearings 120, as disclosed by U.S. Pat. No. 5,634,723 and herein incorporated by reference, allow for a completely sealed electrical generation system. Advantageously, the foil bearings 120 need no oil lubrication and are therefore virtually maintenance free. The generator 116 may be configured to produce electricity upon rotation. It is contemplated the combustion engine 10 may be configured such that a portion of the hydrogen 36 may also be utilized to cool the generator 116.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A combustion engine for combusting hydrocarbon fuel, the combustion engine comprising:

an engine housing having a combustion chamber;

an air intake port fluidly connected to the engine housing and being configured to provide air thereto;

a mixed conductor having a retentate side and a permeate side, the retentate side being fluidly connected to the air intake port, the permeate side being exposed to the combustion chamber, the mixed conductor being configured to conduct oxygen ions from the retentate side to the permeate side when a partial pressure of oxygen in the air on the permeate side is less than a partial pressure of oxygen on the retentate side for providing an oxygen-pure fraction of the air to the combustion chamber;

a water intake port fluidly connected to the combustion chamber and being configured to provide pressurized water to the combustion chamber for subsequent combustion with the hydrocarbon fuel and the oxygen-pure fraction of the air to produce exhaust fluid;

an exhaust turbine having an exhaust turbine inlet, an exhaust turbine outlet and a turbine rotor rotatably coupled to the engine housing, the exhaust turbine inlet being fluidly connected to the combustion chamber for receiving the exhaust fluid, the turbine rotor being configured to rotate upon expansion of the received exhaust fluid from the exhaust fluid inlet, the exhaust turbine outlet being configured to receive the expanded exhaust fluid from the turbine rotor; and a hydrogen compressor assembly fluidly connected to the exhaust turbine outlet for receiving the exhaust fluid, the hydrogen compressor assembly being configured to extract hydrogen from the exhaust fluid and pressurize the extracted exhaust fluid, the hydrogen compressor assembly being further configured to deliver the extracted pressurized hydrogen to the exhaust turbine inlet for recirculation through the exhaust turbine.

2. The combustion engine of claim 1 further comprising a heating system in thermal contact with the mixed conductor, the heating system being configured to heat the mixed conductor.

3. The combustion engine of claim 2 wherein the exhaust fluid contains a residual oxygen-enriched fraction of air, the heating system including an electrical heating element configured to ignite the residual oxygen-enriched fraction of air.

4. The combustion engine of claim 1 wherein the exhaust fluid is partially comprised of carbon monoxide, the combustion engine further comprising an iron oxide catalyst for converting a portion of the carbon monoxide into carbon dioxide, the iron oxide catalyst being disposed within the combustion chamber.

5. The combustion engine of claim 1 wherein the exhaust fluid is at least partially comprised of hydrogen, steam, water and carbon dioxide, the hydrogen compressor assembly including:

a first metal hydride hydrogen compressor fluidly connected to the exhaust turbine outlet for receiving the exhaust fluid, the first metal hydride hydrogen compressor being configured to condense the steam and to adsorb and pressurize a portion of the hydrogen contained in the exhaust fluid;

a gas absorber fluidly connected to the first metal hydride hydrogen compressor for receiving the exhaust fluid and the hydrogen, the gas absorber being configured to allow the water in the exhaust fluid to absorb the carbon dioxide; and a second metal hydride hydrogen compressor fluidly connected to the gas absorber for receiving the exhaust fluid and the hydrogen, the second metal hydride hydrogen compressor being configured to adsorb and pressurize a portion of the hydrogen and to vent a portion of the carbon dioxide to atmosphere.

6. The combustion engine of claim 5 further comprising a desiccant fluidly connected between the gas absorber and the second metal hydride hydrogen compressor, the desiccant being configured to remove moisture from the hydrogen.

7. The combustion engine of claim 5 further comprising a first water pump fluidly connected to the first metal hydride hydrogen compressor for receiving the condensed steam, the first water pump being configured to pressurize the condensed steam.

8. The combustion engine of claim 7 further comprising an intake compressor fluidly connected to the air intake port, the intake compressor being configured to pressurize the air.

9. The combustion engine of claim 8 further comprising a first recuperator fluidly connected to the intake compressor for receiving the pressurized air, the first recuperator being configured to heat the pressurized air.

10. The combustion engine of claim 9 further comprising a second recuperator fluidly connected to the first water pump, the first metal hydride hydrogen compressor, the exhaust turbine and the combustion chamber, the second recuperator being configured to cross-circulate exhaust fluid from the exhaust turbine outlet, condensed steam from the first water pump, and the portion of the hydrogen from the first metal hydride hydrogen compressor for exchanging heat between the exhaust fluid, the condensed steam and the portion of the hydrogen.

11. The combustion engine of claim 10 wherein the exhaust fluid received from the first metal hydride hydrogen compressor contains carbon monoxide and the second recuperator is coated with cuprous oxide for promoting a low temperature water-gas shift reaction for converting the carbon monoxide into carbon dioxide.

12. The combustion engine of claim 5 further comprising:
a gas desorber fluidly connected to the second metal hydride hydrogen compressor for receiving the exhaust fluid, the gas desorber being configured to extract carbon dioxide from the water and vent a remaining portion of the carbon dioxide to atmosphere; and
a second heat exchanger fluidly connected between the gas absorber and the gas desorber for receiving the water, the second heat exchanger being configured to air cool the water;
wherein the gas absorber is fluidly connected to the second heat exchanger for receiving the cooled water, the gas absorber being configured to be cooled by the cooled water for allowing the water in the exhaust fluid to absorb carbon dioxide.

13. The combustion engine of claim 5 wherein the hydrogen compressor assembly further includes:
a first accumulator fluidly connected to the gas absorber for receiving the hydrogen, the first accumulator being configured to store the hydrogen;
a first control valve fluidly connected between the first accumulator and the second metal hydride hydrogen compressor; and
a nickel metal hydride battery fluidly connected to the first control valve, the first control valve being operative to regulate the flow of hydrogen from the first accumulator to the nickel metal hydride battery.

14. The combustion engine of claim 13 wherein the hydrogen compressor assembly further includes:

a second accumulator fluidly connected to the first metal hydride hydrogen compressor for receiving the portion of the hydrogen, the second accumulator being configured to store the portion of the hydrogen; and
a second control valve fluidly connected to the second accumulator, the second control valve being operative to regulate the flow of the portion of the hydrogen from the second accumulator to the combustion chamber.

15. A method of rotating a turbine rotor of an exhaust turbine utilizing recirculated hydrogen extracted from exhaust fluid, the exhaust fluid resulting from the combustion of hydrocarbon fuel in a combustion chamber, the method comprising the steps of:
a) providing a mixed conductor having a retentate side and a permeate side, the permeate side being exposed to the combustion chamber, the mixed conductor being configured to conduct oxygen ions from the retentate side to the permeate side when the partial pressure of oxygen on the permeate side is lower than the partial pressure of oxygen on the retentate side;
b) providing air to the retentate side;
c) providing pressurized water to the combustion chamber;
d) combusting the hydrocarbon fuel upon a partial pressure of oxygen in the air on the permeate side being lower than the partial pressure of oxygen on the retentate side for providing an oxygen-pure fraction of the air to the combustion chamber, the combustion of the hydrocarbon fuel with the pressurized water and the oxygen-pure fraction of the air forming exhaust fluid;
e) rotating the turbine rotor upon expansion of the exhaust fluid received from the combustion chamber through the exhaust turbine;
f) extracting hydrogen from the expanded exhaust fluid received from the exhaust turbine;
g) pressurizing the extracted hydrogen; and
h) recirculating the pressurized extracted hydrogen through the exhaust turbine.

16. The method of claim 15 wherein the exhaust fluid contains water and carbon dioxide and step (f) includes:
a) absorbing the carbon dioxide into the water; and
b) venting a portion of the carbon dioxide to atmosphere.

17. The method of claim 15 wherein the exhaust fluid contains steam and step (g) includes:
a) generating heat by condensing steam in the exhaust fluid; and
b) pressurizing the hydrogen in the exhaust fluid to a pressure greater than the pressure on the permeate side of the combustion chamber by using heat of condensation of the steam.

18. The method of claim 15 wherein step (h) includes heating the hydrogen by recirculation of the hydrogen along the retentate side during combustion of the hydrocarbon fuel.

* * * * *